US011997600B2

United States Patent
Akl et al.

(10) Patent No.: US 11,997,600 B2
(45) Date of Patent: May 28, 2024

(54) SIGNALING TO SUPPORT POWER UTILIZATION MODES FOR POWER SAVING

(71) Applicant: QUALCOMM Incorporated, San Diego, CA (US)

(72) Inventors: Naeem Akl, Somerville, NJ (US); Navid Abedini, Somerset, NJ (US); Junyi Li, Chester, NJ (US); Jianghong Luo, Skillman, NJ (US); Luca Blessent, Whitehouse Station, NJ (US); Karl Georg Hampel, Hoboken, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/010,317

(22) Filed: Sep. 2, 2020

(65) Prior Publication Data

US 2021/0076326 A1 Mar. 11, 2021

Related U.S. Application Data

(60) Provisional application No. 62/897,825, filed on Sep. 9, 2019.

(51) Int. Cl.
*H04W 52/02* (2009.01)

(52) U.S. Cl.
CPC ............................. *H04W 52/0229* (2013.01)

(58) Field of Classification Search
CPC ......... H04W 52/0229; H04W 52/0235; H04W 52/0206; Y02D 30/70
See application file for complete search history.

(56) References Cited

U.S. PATENT DOCUMENTS

2007/0201381 A1  8/2007  Ekl et al.
2012/0015657 A1*  1/2012  Comsa ................. H04L 5/0055
                                        455/456.6
(Continued)

FOREIGN PATENT DOCUMENTS

CN  104093171 A  10/2014
CN  104604302 A  5/2015
(Continued)

OTHER PUBLICATIONS

Ericsson: "Resource Allocation and Scheduling of IAB Networks", 3GPP Draft, 3GPP TSG-RAN WG1 Meeting #94bis, R1-1811513, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 28, 2018, XP051518915, 11 pages, Retrieved from the Internet: URL:http://www.3gpp.org/ftp/tsg%5Fran/WG1%5FRL1/TSGR1%5F94b/Docs/R1%2D1811513%2Ezip [retrieved on Sep. 28, 2018] 2 Resource coordination limitations .<span id="_wysihtml5-undo" class="_wysihtml5-temp">.
(Continued)

*Primary Examiner* — Marcos L Torres
(74) *Attorney, Agent, or Firm* — QUALCOMM Incorporated

(57) ABSTRACT

Methods, systems, and devices for wireless communications are described. Some networks, such as over-deployed integrated access and backhaul (IAB) networks operating in millimeter wave (mmW) bands, may experience high energy consumption if all nodes in the network are fully active at all times. Power utilization modes may mitigate energy consumption by allowing nodes to operate at varying levels of activity. A power utilization mode may include a fully active mode or may drop one or more functions that a fully active node may support, or may support less extensive configurations associated with one or more supported functions, as (Continued)

compared to the configurations associated with a fully active node. Nodes may request information regarding one or more nodes, request a change in power utilizations modes for itself, indicate another node should change modes, or may receive an indication to change modes.

28 Claims, 12 Drawing Sheets

(56) References Cited

U.S. PATENT DOCUMENTS

| | | | |
|---|---|---|---|
| 2012/0083201 | A1 | 4/2012 | Truong et al. |
| 2020/0351682 | A1* | 11/2020 | Cirik .................... H04L 5/0091 |
| 2020/0359321 | A1* | 11/2020 | Chen ....................... H04L 5/008 |
| 2021/0195534 | A1* | 6/2021 | Zheng .................. H04W 52/46 |

FOREIGN PATENT DOCUMENTS

| | | |
|---|---|---|
| EP | 2566255 A1 | 3/2013 |
| KR | 20170111957 A | 10/2017 |
| WO | 2009063417 A1 | 5/2009 |
| WO | WO-2015154792 A1 | 10/2015 |

OTHER PUBLICATIONS

International Search Report and Written Opinion—PCT/US2020/049185—ISAEPO—dated Dec. 21, 2020.

* cited by examiner

SIGNALING TO SUPPORT POWER UTILIZATION MODES FOR POWER SAVING

CROSS REFERENCE

The present application for patent claims the benefit of U.S. Provisional Patent Application No. 62/897,825 by AKL et al., entitled "SIGNALING TO SUPPORT POWER UTILIZATION MODES FOR POWER SAVING," filed Sep. 9, 2019, assigned to the assignee hereof, and expressly incorporated by reference herein.

FIELD OF TECHNOLOGY

The following relates generally to wireless communications and more specifically to signaling to support power utilization modes for power saving.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support both access and backhaul wireless communications. For example, such wireless communication systems may include nodes, which may also be referred to as anchor nodes, parent nodes, relay nodes, or child nodes depending on where the node is within the network, that facilitate wireless communication between a UE and the network. In some cases, a donor node (or anchor node) may have a high-capacity, wired, backhaul connection (e.g., fiber) to the network, while communicating simultaneously with one or more downstream relay nodes (e.g., downstream parent, relay, or child nodes) or UEs. A network that supports communications between a relay node and a UE may be referred to as an access network or link, while a network that supports communications between one or more relay nodes may be referred to as a backhaul network or link. In deployments supporting both access and backhaul, the network may be or implement an integrated access and backhaul (IAB) network.

Wireless communication systems, such as IAB networks, may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, the number of base stations (e.g., IAB nodes) in a network may be increased to expand coverage. Transmissions at mmW frequency ranges may also be more susceptible to link blockage and failure. As a result, the number of IAB-nodes may be increased to enable robust operation. IAB networks operating in mmW frequency ranges may be over-deployed.

SUMMARY

The described techniques relate to improved methods, systems, devices, and apparatuses that support signaling to support power utilization modes for power saving. Generally, the described techniques relate to improved methods, systems, devices, and apparatuses that support implementing power utilization modes in integrated access and backhaul (IAB) systems. The described techniques may provide various techniques to support an increased number of IAB nodes to mitigate signal attenuation, link blockage, and radio link failure to increase system robustness. Increasing the number of nodes may cause the network to become over-deployed. In an over-deployed network, high cost and energy consumption may result if all IAB-nodes are fully active at all times. To decrease energy consumption and reduce cost, one or more IAB-nodes (e.g., child nodes, parent nodes, neighboring nodes) in the IAB network may be reduced to a power saving mode (e.g., a lower power utilization mode). In some cases, multiple power utilization modes may be configured that support varying levels of functionality, or multiple parameter configurations may be configured that are associated with one or more functions. Nodes may support signaling between one or more nodes that indicates a change of power utilization mode by a transmitting node, that may request a receiving node to transmit information about the receiving node's current power utilization mode, that may request a receiving node to change the receiving node's power utilization mode, etc. By implementing power utilization modes, different nodes in an IAB network may operate at varying levels of activity to mitigate cost and energy consumption in an IAB network.

A method of wireless communications at a first node is described. The method may include transmitting signaling that indicates that the first node of a wireless backhaul communications network is operating in a first power utilization mode of a set of different power utilization modes and communicating with a second node of the wireless backhaul communications network based on the first power utilization mode.

An apparatus for wireless communications at a first node is described. The apparatus may include a processor, memory coupled with the processor, and instructions stored in the memory. The instructions may be executable by the processor to cause the apparatus to transmit signaling that indicates that the first node of a wireless backhaul communications network is operating in a first power utilization mode of a set of different power utilization modes and communicate with a second node of the wireless backhaul communications network based on the first power utilization mode.

Another apparatus for wireless communications at a first node is described. The apparatus may include means for transmitting signaling that indicates that the first node of a wireless backhaul communications network is operating in a first power utilization mode of a set of different power utilization modes and communicating with a second node of the wireless backhaul communications network based on the first power utilization mode.

A non-transitory computer-readable medium storing code for wireless communications at a first node is described. The code may include instructions executable by a processor to transmit signaling that indicates that the first node of a wireless backhaul communications network is operating in a first power utilization mode of a set of different power utilization modes and communicate with a second node of the wireless backhaul communications network based on the first power utilization mode.

In some examples of the method, apparatuses, and non-transitory computer-readable medium described herein, transmitting the signaling may include operations, features, means, or instructions for transmitting the signaling that indicates an index corresponding to the first power utilization mode.

In some examples of the method, apparatuses, and non-transitory computer-readable medium described herein, transmitting the signaling may include operations, features, means, or instructions for transmitting the signaling that indicates a function support configuration that indicates which one or more functions of a set of functions may be supported or may be not supported to indicate the first power utilization mode.

In some examples of the method, apparatuses, and non-transitory computer-readable medium described herein, transmitting the signaling may include operations, features, means, or instructions for transmitting the signaling that indicates a service support configuration that indicates which one or more services of a set of services may be supported or may be not supported to indicate the first power utilization mode.

In some examples of the method, apparatuses, and non-transitory computer-readable medium described herein, transmitting the signaling may include operations, features, means, or instructions for transmitting the signaling that indicates a power utilization configuration to indicate the first power utilization mode.

In some examples of the method, apparatuses, and non-transitory computer-readable medium described herein, the power utilization configuration indicates a transmission power level, or a number of communication occasions per time period, or a beam sweep configuration, or a beam configuration, or any combination thereof.

In some examples of the method, apparatuses, and non-transitory computer-readable medium described herein, transmitting the signaling may include operations, features, means, or instructions for transmitting the signaling that indicates a communication configuration that indicates which one or more functions of a set of functions may be supported or may be not supported to indicate the first power utilization mode.

In some examples of the method, apparatuses, and non-transitory computer-readable medium described herein, the communication configuration may be a transmission configuration, or a reception configuration, or a beam configuration, or any combination thereof.

In some examples of the method, apparatuses, and non-transitory computer-readable medium described herein, the communication configuration corresponds to a respective function of the set of functions.

In some examples of the method, apparatuses, and non-transitory computer-readable medium described herein, the communication configuration includes a bit field indicating that a first function of the set of functions may be supported or may be not supported.

In some examples of the method, apparatuses, and non-transitory computer-readable medium described herein, transmitting the signaling may include operations, features, means, or instructions for transmitting the signaling that indicates a communication configuration that indicates which one or more services of a set of services may be supported or may be not supported to indicate the first power utilization mode.

In some examples of the method, apparatuses, and non-transitory computer-readable medium described herein, the communication configuration may be a transmission configuration, or a reception configuration, or a beam configuration, or any combination thereof.

In some examples of the method, apparatuses, and non-transitory computer-readable medium described herein, the communication configuration corresponds to a respective service of the set of services.

In some examples of the method, apparatuses, and non-transitory computer-readable medium described herein, the communication configuration includes a bit field indicating that a first service of the set of services may be supported or may be not supported.

Some examples of the method, apparatuses, and non-transitory computer-readable medium described herein may further include operations, features, means, or instructions for receiving a mode change request that requests that the first node operate in the first power utilization mode, where the first power utilization mode may be transmitted based on the mode change request.

Some examples of the method, apparatuses, and non-transitory computer-readable medium described herein may further include operations, features, means, or instructions for receiving a mode change instruction that instructs the first node to operate in the first power utilization mode, where the first power utilization mode may be transmitted based on the mode change instruction.

In some examples of the method, apparatuses, and non-transitory computer-readable medium described herein, the mode change instruction indicates when the first node may be to operate in the first power utilization mode.

Some examples of the method, apparatuses, and non-transitory computer-readable medium described herein may further include operations, features, means, or instructions for determining a signaling configuration, where the signaling may be transmitted in accordance with the signaling configuration.

In some examples of the method, apparatuses, and non-transitory computer-readable medium described herein, the signaling configuration may be a periodic signaling configuration, an aperiodic signaling configuration, or an event-triggered signaling configuration, or any combination thereof.

In some examples of the method, apparatuses, and non-transitory computer-readable medium described herein, the signaling configuration indicates a periodicity in which the first node may be to transmit the signaling, or a time when the first node may be to transmit the signaling, or a reporting condition after detection of which the first node may be to transmit the signaling, or any combination thereof.

In some examples of the method, apparatuses, and non-transitory computer-readable medium described herein, determining the signaling configuration may include operations, features, means, or instructions for receiving the signaling configuration from a central unit (CU) of the wireless backhaul communications network.

In some examples of the method, apparatuses, and non-transitory computer-readable medium described herein, a local control node associated with the first node determines the signaling configuration.

Some examples of the method, apparatuses, and non-transitory computer-readable medium described herein may further include operations, features, means, or instructions for detecting a power status change, or a network load change, or a reporting request, or a handover request, or a reporting condition, or any combination thereof, based on the signaling configuration, where the signaling may be transmitted based on the detecting.

In some examples of the method, apparatuses, and non-transitory computer-readable medium described herein, transmitting the signaling may include operations, features, means, or instructions for transmitting the signaling to indicate time information to indicate when the first power utilization mode may be active.

In some examples of the method, apparatuses, and non-transitory computer-readable medium described herein, transmitting the signaling may include operations, features, means, or instructions for transmitting the signaling within a first resource of a set of available resources to indicate the first power utilization mode.

In some examples of the method, apparatuses, and non-transitory computer-readable medium described herein, communicating with the second node may include operations, features, means, or instructions for communicating with the second node of the wireless backhaul communications network that may be a parent node, or a child node, or a neighbor node, or a control entity, or any combination thereof, of the wireless backhaul communications network.

Some examples of the method, apparatuses, and non-transitory computer-readable medium described herein may further include operations, features, means, or instructions for transmitting second signaling to indicate a third node of the wireless backhaul communications network may be operating in a second power utilization mode of the set of different utilization modes, where the third node may be a parent node, or a child node, or a neighbor node, or any combination thereof.

Some examples of the method, apparatuses, and non-transitory computer-readable medium described herein may further include operations, features, means, or instructions for transmitting second signaling requesting that a third node transmit information indicating in which power utilization mode of the set of different utilization modes the third node may be operating, where the third node may be a parent node, or a child node, or a neighbor node, or any combination thereof.

Some examples of the method, apparatuses, and non-transitory computer-readable medium described herein may further include operations, features, means, or instructions for transmitting second signaling to instruct a third node to operate in a second power utilization mode of the set of different utilization modes, where the third node may be a parent node, or a child node, or a neighbor node, or any combination thereof.

In some examples of the method, apparatuses, and non-transitory computer-readable medium described herein, transmitting the signaling may include operations, features, means, or instructions for transmitting the signaling that may be downlink control information (DCI), or a radio resource control (RRC) message, or a layer one (L1) reference signal, or a medium access control (MAC) control element (CE), or a master information block (MIB), or a system information block (SIB), or uplink control information (UCI), or a random access channel (RACH) message, any combination thereof.

In some examples of the method, apparatuses, and non-transitory computer-readable medium described herein, transmitting the signaling may include operations, features, means, or instructions for transmitting the signaling from a CU or a distributed unit (DU) to a mobile terminal (MT).

In some examples of the method, apparatuses, and non-transitory computer-readable medium described herein, the first node may be configured to perform a MT function or a DU function and the second node may be configured as a CU or to perform a MT function or a DU function.

In some examples of the method, apparatuses, and non-transitory computer-readable medium described herein, the first node may be an IAB node and the second node may be a CU, or a user equipment (UE), or an IAB node.

In some examples of the method, apparatuses, and non-transitory computer-readable medium described herein, the first power utilization mode utilizes less power than a second power utilization mode of the set of different utilization modes.

A method of wireless communications at a first node is described. The method may include receiving signaling that indicates that a second node of a wireless backhaul communications network is operating in a first power utilization mode of a set of different power utilization modes and communicating with the second node of the wireless backhaul communications network based on the first power utilization mode.

An apparatus for wireless communications at a first node is described. The apparatus may include a processor, memory coupled with the processor, and instructions stored in the memory. The instructions may be executable by the processor to cause the apparatus to receive signaling that indicates that a second node of a wireless backhaul communications network is operating in a first power utilization mode of a set of different power utilization modes and communicate with the second node of the wireless backhaul communications network based on the first power utilization mode.

Another apparatus for wireless communications at a first node is described. The apparatus may include means for receiving signaling that indicates that a second node of a wireless backhaul communications network is operating in a first power utilization mode of a set of different power utilization modes and communicating with the second node of the wireless backhaul communications network based on the first power utilization mode.

A non-transitory computer-readable medium storing code for wireless communications at a first node is described. The code may include instructions executable by a processor to receive signaling that indicates that a second node of a wireless backhaul communications network is operating in a first power utilization mode of a set of different power utilization modes and communicate with the second node of the wireless backhaul communications network based on the first power utilization mode.

In some examples of the method, apparatuses, and non-transitory computer-readable medium described herein, receiving the signaling may include operations, features, means, or instructions for receiving the signaling that indicates an index corresponding to the first power utilization mode.

In some examples of the method, apparatuses, and non-transitory computer-readable medium described herein, receiving the signaling may include operations, features, means, or instructions for receiving the signaling that indicates a function support configuration that indicates which one or more functions of a set of functions may be supported or may be not supported to indicate the first power utilization mode.

In some examples of the method, apparatuses, and non-transitory computer-readable medium described herein, receiving the signaling may include operations, features, means, or instructions for receiving the signaling that indicates a service support configuration that indicates which one or more services of a set of services may be supported or may be not supported to indicate the first power utilization mode.

In some examples of the method, apparatuses, and non-transitory computer-readable medium described herein, receiving the signaling may include operations, features, means, or instructions for receiving the signaling that indicates a power utilization configuration to indicate the first power utilization mode.

In some examples of the method, apparatuses, and non-transitory computer-readable medium described herein, the power utilization configuration indicates a transmission power level, or a number of communication occasions per time period, or a beam sweep configuration, or a beam configuration, or any combination thereof.

In some examples of the method, apparatuses, and non-transitory computer-readable medium described herein, receiving the signaling may include operations, features, means, or instructions for receiving the signaling that indicates a communication configuration that indicates which one or more functions of a set of functions may be supported or may be not supported to indicate the first power utilization mode.

In some examples of the method, apparatuses, and non-transitory computer-readable medium described herein, the communication configuration may be a transmission configuration, or a reception configuration, or a beam configuration, or any combination thereof.

In some examples of the method, apparatuses, and non-transitory computer-readable medium described herein, the communication configuration corresponds to a respective function of the set of functions.

In some examples of the method, apparatuses, and non-transitory computer-readable medium described herein, the communication configuration includes a bit field indicating that a first function of the set of functions may be supported or may be not supported.

In some examples of the method, apparatuses, and non-transitory computer-readable medium described herein, receiving the signaling may include operations, features, means, or instructions for receiving the signaling that indicates a communication configuration that indicates which one or more services of a set of services may be supported or may be not supported to indicate the first power utilization mode.

In some examples of the method, apparatuses, and non-transitory computer-readable medium described herein, the communication configuration may be a transmission configuration, or a reception configuration, or a beam configuration, or any combination thereof.

In some examples of the method, apparatuses, and non-transitory computer-readable medium described herein, the communication configuration corresponds to a respective service of the set of services.

In some examples of the method, apparatuses, and non-transitory computer-readable medium described herein, the communication configuration includes a bit field indicating that a first service of the set of services may be supported or may be not supported.

Some examples of the method, apparatuses, and non-transitory computer-readable medium described herein may further include operations, features, means, or instructions for transmitting a mode change request that requests that the second node operate in the first power utilization mode, where the first power utilization mode may be received based on the mode change request.

Some examples of the method, apparatuses, and non-transitory computer-readable medium described herein may further include operations, features, means, or instructions for transmitting a mode change instruction that instructs the second node to operate in the first power utilization mode, where the first power utilization mode may be received based on the mode change instruction.

In some examples of the method, apparatuses, and non-transitory computer-readable medium described herein, the mode change instruction indicates when the first node may be to operate in the first power utilization mode.

Some examples of the method, apparatuses, and non-transitory computer-readable medium described herein may further include operations, features, means, or instructions for determining a signaling configuration, where the signaling may be received in accordance with the signaling configuration.

In some examples of the method, apparatuses, and non-transitory computer-readable medium described herein, the signaling configuration may be a periodic signaling configuration, an aperiodic signaling configuration, or an event-triggered signaling configuration, or any combination thereof.

In some examples of the method, apparatuses, and non-transitory computer-readable medium described herein, the signaling configuration indicates a periodicity in which the second node may be to transmit the signaling, or a time when the second node may be to transmit the signaling, or a reporting condition after detection of which the second node may be to transmit the signaling, or any combination thereof.

In some examples of the method, apparatuses, and non-transitory computer-readable medium described herein, the first node may be a CU or a DU in the wireless backhaul communications network.

In some examples of the method, apparatuses, and non-transitory computer-readable medium described herein, a local control node associated with the first node determines the signaling configuration.

In some examples of the method, apparatuses, and non-transitory computer-readable medium described herein, the signaling may be received based on a detection of a power status change, or a network load change, or a reporting request, or a handover request, or a reporting condition, or any combination thereof.

In some examples of the method, apparatuses, and non-transitory computer-readable medium described herein, receiving the signaling may include operations, features, means, or instructions for receiving the signaling that indicates time information to indicate when the first power utilization mode may be active.

In some examples of the method, apparatuses, and non-transitory computer-readable medium described herein, receiving the signaling may include operations, features, means, or instructions for receiving the signaling within a first resource of a set of available resources to indicate the first power utilization mode.

In some examples of the method, apparatuses, and non-transitory computer-readable medium described herein, communicating with the second node may include operations, features, means, or instructions for communicating with the second node of the wireless backhaul communications network that may be a parent node, or a child node, or a neighbor node, or a control entity, or any combination thereof, of the wireless backhaul communications network.

Some examples of the method, apparatuses, and non-transitory computer-readable medium described herein may further include operations, features, means, or instructions for receiving second signaling that indicates a third node of the wireless backhaul communications network may be operating in a second power utilization mode of the set of different utilization modes, where the third node may be a parent node, or a child node, or a neighbor node, or any combination thereof.

Some examples of the method, apparatuses, and non-transitory computer-readable medium described herein may further include operations, features, means, or instructions for receiving second signaling from a third node that indicates that the third node may be operating in a second power utilization mode of the set of power utilization modes, where the third node may be a parent node, or a child node, or a neighbor node, or any combination thereof.

In some examples of the method, apparatuses, and non-transitory computer-readable medium described herein, receiving the signaling may include operations, features, means, or instructions for receiving the signaling that may be DCI, or an RRC message, or an L1 reference signal, or a MAC CE, or an MIB, or an SIB, or UCI, or a RACH message, any combination thereof.

In some examples of the method, apparatuses, and non-transitory computer-readable medium described herein, receiving the signaling may include operations, features, means, or instructions for receiving the signaling at a CU or a DU from a MT.

In some examples of the method, apparatuses, and non-transitory computer-readable medium described herein, the first node may be configured to perform a MT function or a DU function and the second node may be configured as a CU or to perform a MT function or a DU function.

In some examples of the method, apparatuses, and non-transitory computer-readable medium described herein, the first node may be an IAB node and the second node may be a CU, or a UE, or an IAB node.

In some examples of the method, apparatuses, and non-transitory computer-readable medium described herein, the first power utilization mode utilizes less power than a second power utilization mode of the set of different utilization modes.

DETAILED DESCRIPTION

Figure 1:
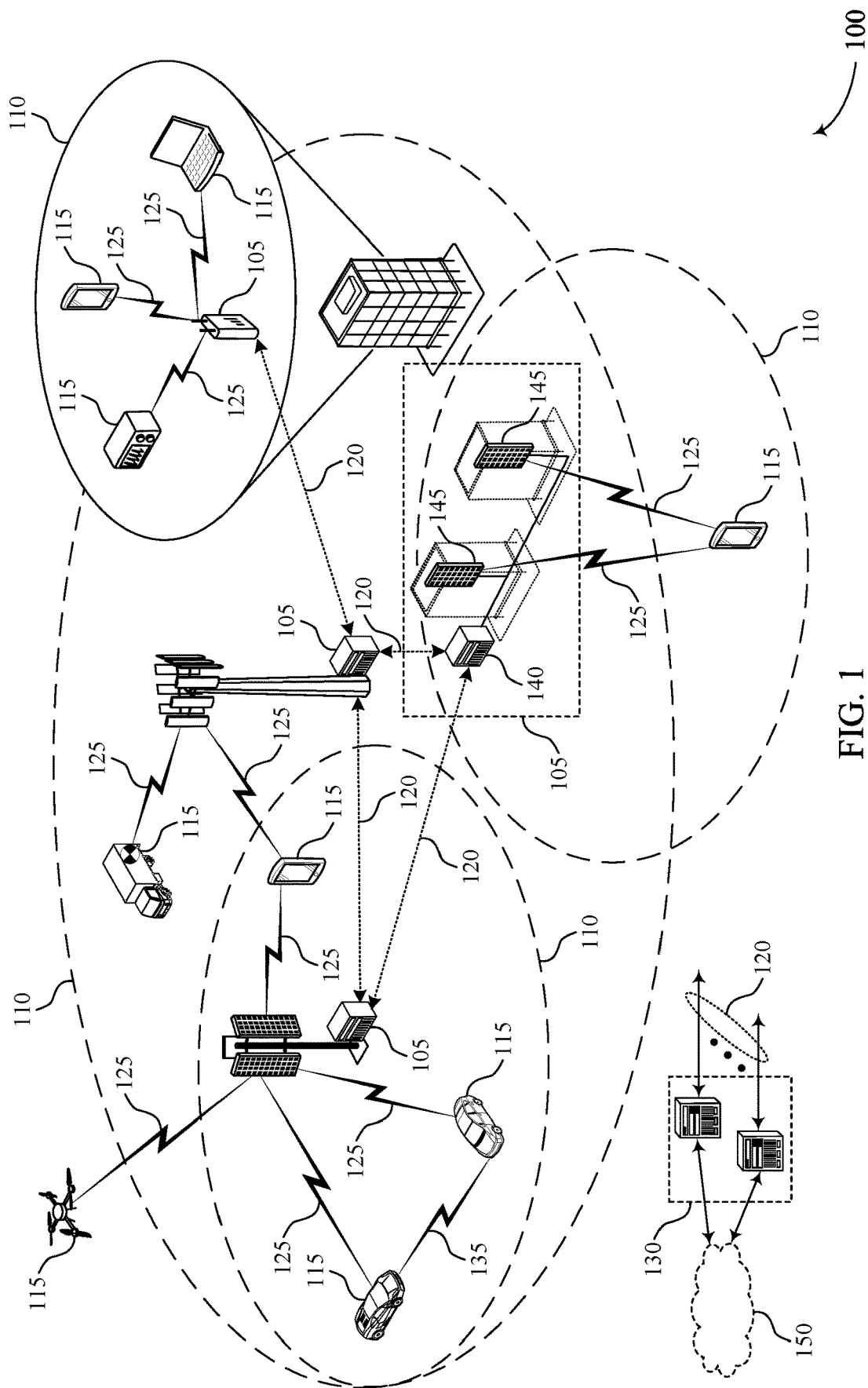
FIG. 1 illustrates an example of a system for wireless communications in accordance with aspects of the present disclosure.

Some wireless communication systems may support an integrated access and backhaul (IAB) network that includes an IAB donor (or anchor) node and one or more relay nodes downstream from the donor node. In some aspects, an IAB network shares resources between access and backhaul links such that access traffic may be relayed on wireless backhaul. In some cases, the same technology may be used for access links and backhaul links. IAB donor nodes may provide access to child UEs and the wireless backhaul functionality to IAB-nodes. An IAB donor may include a central unit (CU) for control of the IAB-network and one or more distributed units (DU) for scheduling of child IAB-nodes. An IAB donor may have a wireline connection to the core network. Downstream from the IAB donor node may include one or more IAB nodes (also referred to as parent nodes, relay nodes, or child nodes, depending upon where the node is within the IAB network) within the IAB network, with each wirelessly relaying traffic of its child nodes (e.g., UEs, or other IAB nodes), to the parent node (e.g., IAB donor, or IAB-node). A UE may connect wirelessly to a donor or IAB-node that is within range of the UE.

Wireless communication systems may operate in millimeter wave (mmW) frequency ranges, e.g., 28 GHz, 40 GHz, 60 GHz, etc. For example, IAB networks may operate at mmW frequency ranges due to high speed demands and a lack of fiber deployment. Wireless communications at these frequencies may be associated with increased signal attenuation (e.g., path loss) during propagation, which may be influenced by various factors, such as temperature, barometric pressure, diffraction, etc. To mitigate the impact of signal attenuation on the network and/or to increase coverage, the number of IAB-nodes may be increased. In some cases, transmissions at mmW frequency ranges may be more susceptible to link blockage and/or link failure. To provide more robust operation, the number of IAB may be increased. Increasing the number of IAB-nodes to mitigate signal attenuation, signal blockage, and signal failure may cause IAB-networks to become over-deployed.

In an IAB-network that is over-deployed, there may be high overhead and energy consumption if all IAB-nodes are fully active at all times and in some cases, each IAB-node may not have AC-power, but rather may operate using a battery. As such, it may be beneficial to increase (e.g., maximize) power saving while mitigating network malfunction or service disruption. To implement power saving, IAB-nodes in a network may operate at different activity levels such that not all IAB-nodes in a network are fully activity if load in that network or region of the network is low.

An IAB-node may be configured to operate at one or more power utilization modes. A power utilization mode may be a fully active mode or one or more power saving modes that use varying amounts of power. The power consumption while using a power saving mode may be reduced as compared to power utilization by the fully active mode. Multiple power utilization modes may be configured where each mode may vary the functionality of an IAB-node, or may adjust the configuration at which functions are performed, or a combination thereof. Nodes may transmit signaling between nodes to indicate the current power utilization mode of a node, to request information about the power utilization mode that another node is operating at, to request to change modes, to request for another node to change modes, or a combination thereof. In some implementations, the power utilization mode of a node may be based on the load of the network or region such that regions with lower loads may use power utilization modes that conserve more energy.

Particular aspects of the subject matter described herein may be implemented to realize one or more advantages. The described techniques may support improvements in power consumption, decrease overhead, and improve reliability in an IAB network, among other advantages. As such, supported techniques may include improved network operations and, in some examples, may promote network efficiencies, among other benefits.

Aspects of the disclosure are initially described in the context of a wireless communications system. The described techniques relate to improved methods, systems, devices, and apparatuses that support power utilization modes in an IAB network. Aspects of the disclosure are initially described in the context of wireless communications systems.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The described techniques relate to improved methods, systems, devices, and apparatuses that support implementing power utilization modes in IAB systems. Generally, the described techniques provide for various techniques to support an increased number of IAB nodes to mitigate signal attenuation and link blockage and failure which may increase system robustness. To decrease energy consumption and reduce cost that is associated with an over-deployed network, one or more IAB-nodes (e.g., child nodes, parent nodes, neighboring nodes) in the IAB network may implement a power utilization mode in accordance with network traffic conditions. There may be multiple power utilization modes that reduce the functionality of the IAB-nodes, or may change the parameter configuration associated with one or more functions, or a combination thereof. A power utilization modes may be a fully active mode that maintains full functionality of an IAB-node. There may be signaling between one or more nodes that indicate a change of power utilization mode of the transmitting node, that may request a receiving node to transmit information about the receiving node's current power utilization mode, that may request a receiving node change the receiving node's power utilization mode, etc. By implementing power utilization modes, different nodes in an IAB network may operate at varying levels of activity to mitigate overhead and energy consumption in an over-deployed IAB network.

Figure 2:
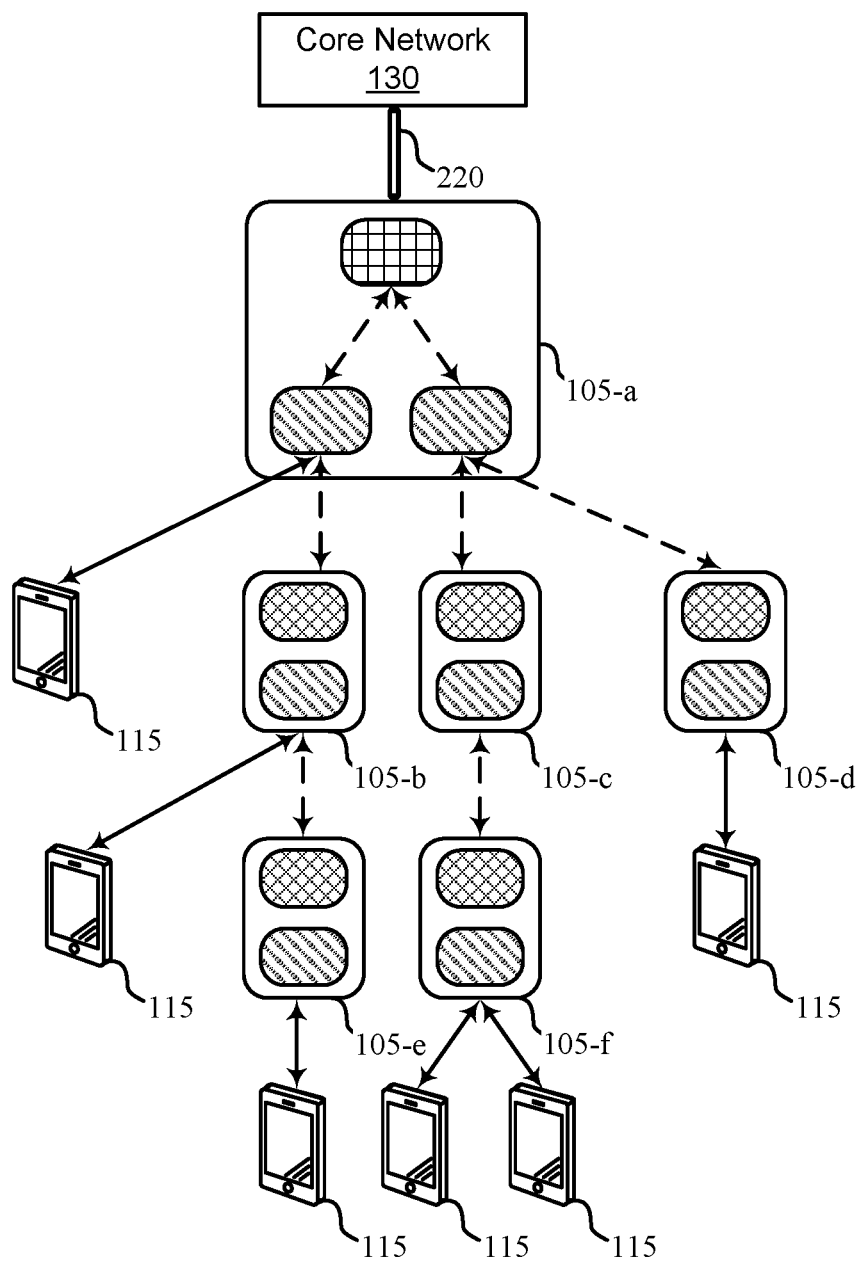
FIG. 2 illustrates an example of a system for wireless communications in accordance with aspects of the present disclosure.

FIG. 2 illustrates an example of a wireless communications system 200 in accordance with various aspects of the present disclosure. In some examples, the wireless communications system 200 may implement aspects of the wireless communications system 100 described with reference to FIG. 1. For example, the wireless communications system 200 may be an IAB network operating at mmW frequency bands that supports implementation of power utilization modes. The wireless communications system 200 may include a core network 130 (such as an NGC) and one or more network devices 105 (such as one or more base stations/IAB nodes that may operate as parent access nodes, intermediate access nodes, or child access nodes) that may be split into one or more support entities (such as functionalities) to improve the efficiency of the network communications.

The wireless communications system 200 may include a donor network device 105-a (such as a donor IAB node or donor base station) that provides CU 225 functionality, DU 230 functionality, or both. The donor device 105-a may be associated with one or more DUs in which each DU 230 associated with the donor network device 105-a may be partially controlled by the CU 225 of the network device 105-a. In some examples, the CU 225 and the DUs 230 may be located within a single device. In some examples, the DUs 230 of the donor network device 105-a may be externally located, and may be in wired or wireless communication with the CU 225. The CU 225 may be a component of a database, data center, core network, or network cloud, and may host layer 3 (L3) (such as radio resource control (RRC), service data adaption protocol (SDAP), or packet data convergence protocol (PDCP)) functionality and signaling. The CU 225 may be a central entity that controls or otherwise configures resources within the IAB network.

The CU 225 of the donor network device 105-a may communicate with the core network 130 over a backhaul connection 220, for example, an NG interface (which may be an example of a portion of a backhaul link). The DUs 230 may host lower layer, such as layer 1 (L1) and L2 (such as RLC, MAC, or physical (PHY)) functionality and signaling. The DUs 230 of a donor network device 105-a of an IAB network may support one of multiple serving cells of the network coverage according to connections associated with backhaul links 210 and access links 215 of the IAB network. The DUs 230 of the donor network device 105-a may control one or more of the access links 215 and the backhaul links 210 within the corresponding network coverage and provide controlling and scheduling for child devices such as relay network devices 105 (intermediate access nodes) or UEs 115.

Each IAB node 105 may relay traffic from a donor node through one or more hops (e.g., relay nodes). Each of the network devices 105 (e.g., IAB nodes, base stations) may support mobile terminal (MT) 235 and/or DU 230 functionality. The MT 235 functionality (such as UE-F) of each network device 105 may be controlled or scheduled by one or more antecedent (for example, parent) network devices 105 (such as parent access nodes). For example, an access node may be controlled or scheduled by a donor access node, or another upstream access node of the established connectivity via the access links 215 and the backhaul links 210 of a coverage area. A DU 230 of a network device 105 may be controlled by an MT 235 of the network device 105. In addition, the DU 230 of the network device 105 may be partially controlled by signaling messages from the CU 225 entities of the associated donor network devices 105 (such as donor network device 105-a) of the network connection (such as via an F1 application protocol (F1-AP) interface). The DU 230 of the network device 105 may support one of multiple serving cells of the network coverage area. DU 230 functionality (such as AN-F) may schedule one or more of the child network devices 105 (such as child access nodes) or the UEs 115, and may control one or more of the access links 215 or the backhaul links 210 under its coverage.

For example, network device 105-e may be a parent node of a UE 115 but may be a child node of network device 105-b which may be a child node of network device 105-a. Network device 105-f may be a parent node to one or more UEs 115 but may be a child node of network device 105-c which may be a child node of network device 105-a. Network device 105-d may be a parent node to a UE 115 but may be a child node of network device 105-a.

The wireless communications system 200 may implement 5G NR technologies (such as millimeter wave (mmW)) to support an access network (for example, between each access node, such as between one or more network devices 105 or one or more associated UEs 115) and a backhaul network (for example, between access nodes, such as network devices 105). An IAB donor (or an "anchor") may refer to a network device 105 that has a wireline connection to the core network 130 (such as backhaul connection 220), and an IAB node may refer to a network device 105 that relays traffic to or from the donor through one or more hops. IAB networks may thus share resources between access links 215 and backhaul links 210, and may reuse aspects of access network frameworks.

Wireless communication systems may operate in millimeter wave (mmW) frequency ranges, e.g., 28 GHz, 40 GHz, 60 GHz, etc. For example, IAB networks may operate at mmW frequency bands to meet high speed demand and due to a lack of fiber deployment. In some cases, fiber deployment may be lacking because of overhead considerations. Wireless communications at these frequencies may be associated with increased signal attenuation (e.g., path loss), which may be influenced by various factors, such as temperature, barometric pressure, diffraction, etc. At these frequencies, signal blockage and signal failure are also possible. As a result, the number of network device 105 in an IAB-network may be increased to mitigate signal attenuation, blockage, and failure. An increased number of network devices 105 may result in over-deployment of a network, and thus, significant overhead and energy consumption may result if all network devices 105 are fully active at all times.

To lower overhead and energy consumption in an over-deployed network the activity of one or more network devices 105 may be decreased. For example, a network device 105 may be fully active or may enter a power saving mode that may lower the energy usage at the network device 105. A network device 105 may be configured to operate according to one or more power utilization modes that may include a fully active mode or one or more power saving modes. While operating according to a power saving mode, an IAB-node may use less power than an IAB-node that is operating according to a fully active mode. A network that implements power utilization modes, including power saving modes, may reduce power usage across the network compared to a network that maintains full activity of all IAB-nodes at all times. In some implementations, high power savings may be associated with low signal availability because some functions or configurations of one or more network devices may be lowered. In some examples, low power savings or high energy consumption may be associated with high signal availability because the activity of the network devices may be higher. In some cases, one or more operation points (e.g., optimal operation points) may exist where UEs 115 and network devices 105 may be sufficiently covered and power consumption is lessened when possible. For example, to provide sufficient coverage of the network during certain loads, some subset of network devices 105 may remain fully active while other network devices 105 may enter power utilization modes.

In some cases, the activity level or power utilization mode of a network device 105 may be based on the load of the region served by the network device 105. For example, regions of the network that have a large load (e.g., regions that serve a large number of UEs 115 or child nodes) may include network devices 105 that are fully active or operate under power utilization modes that allow the network device to have a high level of activity. In some cases, regions that have lower loads (e.g., regions that serve a low number of UEs 115 or child nodes) may include network devices 105 that operate under power utilization modes associated with low levels of network device 105 activity. For example, network device 105-*d* may experience less load than network device 105-*f* and network device 105-*d* may be configured with a power utilization mode that conserves more power than the power utilization mode of network device 105-*f*, or network device 105-*f* may be fully active.

In some cases, one or more network devices 105 may not be connected to AC power and instead rely on a battery. In this case, if network devices 105 that rely on battery power are fully active at all times, the battery may drain and may lead to costly and inefficient maintenance of the network. Power utilization modes may be assigned to any network device 105 in the network to reduce power consumption regardless of whether the network device 105 is connected to AC power. In some cases, the network devices 105 not connected to AC power may be prioritized such that the battery-operated network devices 105 may be assigned a power utilization mode before a neighboring network device 105 that is connected to AC power. For example, network device 105-*e* may not be connected to AC power and may be configured with a power utilization mode to conserve battery power.

A power utilization mode may vary the functions performed by the network device 105. In some cases, a power utilization mode may drop one or more functions. Additionally or alternatively, a network device 105 may perform all configured or a subset of configured functions but at different configurations. Multiple power utilization modes may be configured that one or more network devices 105 may be configured to operate at. For example, networks devices 105-*b*, 105-*c*, 105-*d*, 105-*e*, and 105-*f* may each be configured to operate at a different power utilization mode or may be configured to operate at a fully active state. Network devices 105 (e.g., IAB-nodes) may have different levels of power-saving associated with what functions or services the network device 105 drops compared to a fully-active network device 105. For example, the functions may include sending synchronization signal blocks (SSBs)/system information blocks (SIB) (e.g., SIB1) for initial access, sending SSBs/channel state information-reference signals (CSI-RSs) for handover or measurements, listening to the physical random access channel (PRACH) for initial access or handover, sending paging messages, discovery of neighboring IAB-nodes, data communication, etc.

In some cases, one or more functions performed by a network device 150 may be dismissed by (e.g., not supported) a power utilization mode. There may be many combinations of the functions performed (e.g., supported) or dismissed in a particular power utilization mode. For example, a power utilization mode that supports a fully active node may transmit SSB/SIB1 information to be read by a UE 115 for initial access and transmit SSB/CSI-RS for handover and measurements at a configured periodicity. In some examples, a particular power utilization mode may configure a network device 105 to dismiss functions related to initial access. The network device 105 may continue to transmit SSB/CSI-RS for handover or measurements but the network device 105 may not send SSB/SIB1 for the purpose of initial access. In some cases, a power utilization mode may configure a network device 105 to send reference signals and control data but to refrain from data communication because data communication may be associated with high power consumption to meet high speed requirements. Multiple power utilization modes may be configured where each may vary the functions, or combinations of functions, supported by a network device 105.

In some cases, the configuration of a supported function may vary compared to the configuration supported by a fully active network device 105. A power utilization mode may configure a network device 105 to operate using a configuration that sets values for one or more parameters to control the amount of power used by the network device 105. In some cases, the parameters that may be reduced may be the transmission power, periodicity of transmissions, periodicity or receptions, the number of transmission or reception occasions per period (e.g., duty cycle), beam sweep configurations for measurement reference signals or broadcast signals and messages (e.g., number of beams, beam shape), beam configuration for control or data communication (e.g., beam width), etc. For example, a first power utilization configuration may configure a network device 105 to operate using a higher transmission power as compared to a second power utilization mode that may configure a network device 105 to operate using a lower transmission power.

The parameters indicated in the power utilization modes may be function specific. For example, a power utilization mode may indicate that the transmission power used for functions related to initial access may be lower than the transmission power used for functions related to data communication. Power utilization modes may vary the functions supported and the configuration for parameters associated with each function to control the amount of power a network device 105 uses.

For example, the power utilization mode may indicate that the transmission power at which the network device uses for one or more functions such as sending SSB/SIB1 for initial access may be reduced. The network device 105 may continue to perform other functions at the transmission power of a fully active network device 105 but may lower the transmission power for sending SSB/SIB1 for initial access. The periodicity or how often a function is performed may also be varied. For example, if the network device 105 is configured to transmit paging messages to UEs 115, the network device 105 may transmit the paging messages less frequently than the fully active network device 105 but may continue performing other functions at the same periodicity that a fully active device does. In some cases, the number of transmission or reception occasions per period may be lowered. For example, the signal for mmW frequency ranges is directional and may rely on the same signal being sent on many different beams or directions. Reducing the number of transmission or reception occasions per period may reduce the number of beams the same signal is transmitted on. In some cases, the beam sweep configuration for measuring or transmitting reference signals, and broadcasting signals and messages may be varied. For example, the number of beams, beam width, beam shape, or a combination thereof may be varied for beam sweeping. In some cases, the beam configuration for control or data communication may be varied. For example, the beam width may be varied for control or data communication. A power utilization mode may vary the functions that are supported and the configuration of parameters for each supported function.

In some cases, different modes of activity of network devices 105 (IAB-nodes) may be impacted. The operation of network devices 105 in different power utilization modes may impact various network functions or procedures. For example, modes impacted may include initial access for UEs/MTs, handover of UEs/MTs, paging, timing advance (TA)/radio access network (RAN) area code (AC) update, discovery of neighboring nodes, maintenance of IAB network (e.g., synchronization among nodes, maintaining path to donor), etc.

Figure 3:
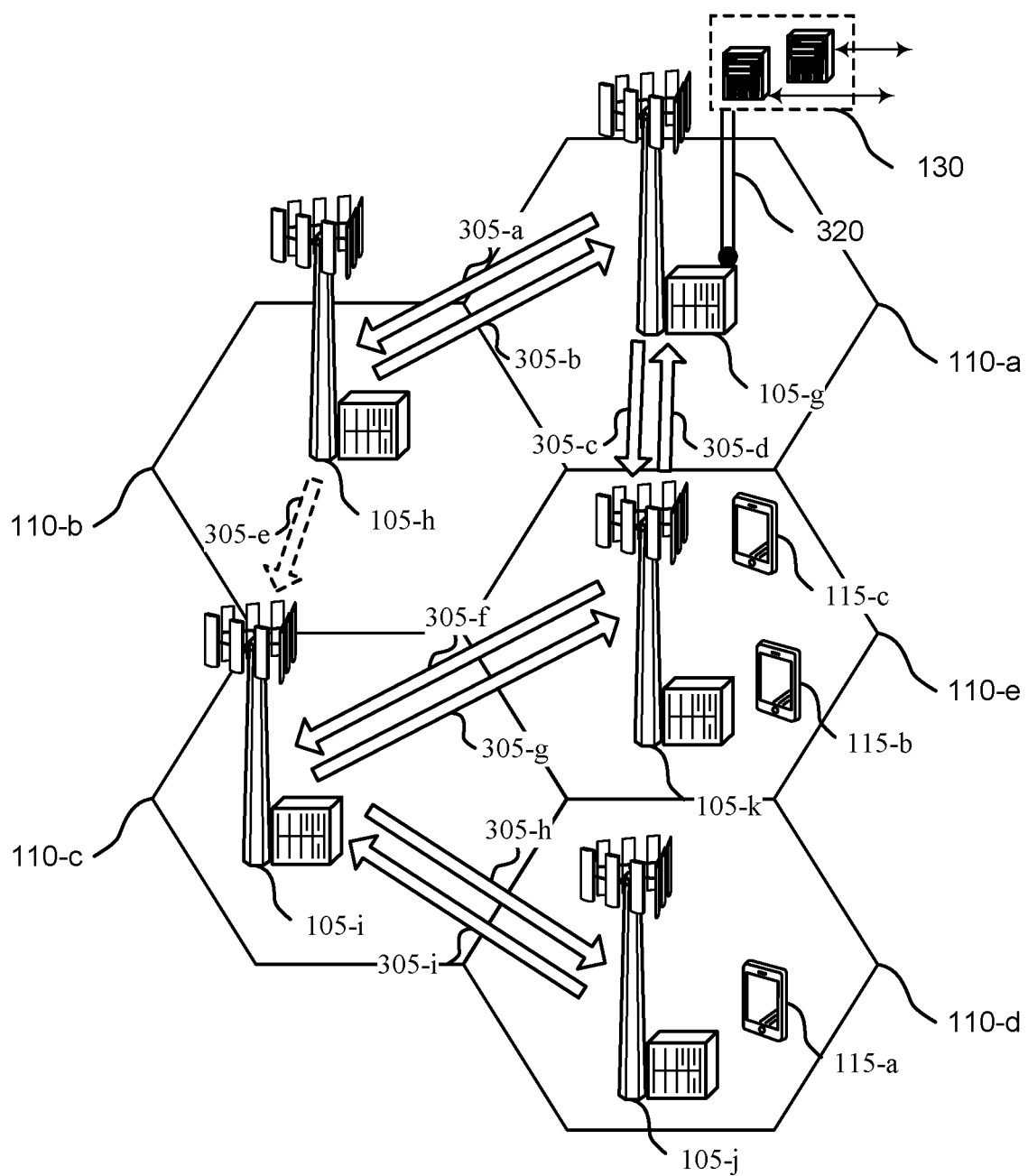
FIG. 3 illustrates an example of a system for wireless communications in accordance with aspects of the present disclosure.

FIG. 3 illustrates an example of a wireless communications system 300 in accordance with various aspects of the present disclosure. In some examples, the wireless communications system 300 may implement aspects of the wireless communications systems 100 or 200. The wireless communications system 300 may support one or more network devices 105 (for example, access nodes) that in turn may support network access for one or more UEs 115 within coverage areas 110 (e.g., cells). One or more of the network devices 105 may be connected to a core network 130 via a wireline backhaul connection 220 (such as backhaul connection 320). Infrastructure and spectral resources for network access within the wireless communications system 300 may additionally support one or more wireless backhaul links between the network devices 105. For example, the wireless backhaul links may support an IAB network architecture, with the network devices 105 serving as IAB nodes.

The wireless communications system 300 may implement an IAB architecture by connecting one access node (an IAB "donor" node), such as the network device 105-g, to the core network 130 via a fiber point backhaul connection 320. Other network devices 105 in the wireless communications system 300 (such as a network device 105-h, a network device 105-i, a network device 105-j, or a network device 105-k) may propagate access traffic to and from the donor IAB node via the wireless backhaul network using wireless backhaul links (such as using beamformed wireless backhaul transmissions). Each network device 105 may communicate the access traffic with the one or more UEs 115 that is served by the particular network device 105 over the access network using wireless access links (such as using beamformed wireless access transmissions).

In some examples, the network device 105-g may be split into associated base station CU and DU entities, in which one or more DU entities ("DUs") may be partially controlled by an associated CU entity ("CU"). The CU entity of the network device 105-g may facilitate connection between the core network 130 and the network device 105-g (such as via a wireline backhaul connection 320 or, in some examples, a wireless connection to the core network). The DUs of the network device 105-g may control or schedule functionality for additional devices (such as for intermediate access nodes that may include, for example, one or more of the network device 105-h, the network device 105-k, or for the UEs 115) according to configured wireless backhaul links and the wireless access links. Based on the supported entities at the network device 105-g (such as the CU entity), the network device 105-g may be referred to as an IAB donor.

An intermediate access node (such as the network device 105-h and the network device 105-k) may support link connectivity with the IAB donor (such as the network device 105-g) as part of a relay chain within the IAB network architecture. For example, the network device 105-h may be split into associated MT and DU entities, in which the MT functionality of the network device 105-h may be controlled or scheduled by a DU entity of the network device 105-g. The DUs associated with the network device 105-h may be controlled by the MT functionality of the network device 105-h. In addition, in some examples, one or more DUs of the network device 105-h may be partially controlled by signaling messages from the CU entities of associated IAB donor nodes (such as a CU of the network device 105-g) of the network connection (such as via an F1-AP). The DU of the network device 105-h may support coverage area 110-b (e.g., a serving cell) of the IAB network coverage area, and may provide for communications with one or more UEs 115 via access links. Based on the supported entities at the network device 105-h, the network device 105-h may be referred to as an intermediate access node, a relay network device, an IAB node, or a relay node, among other examples.

A network device 105 (such as an intermediate access node) may thus be configured for access network functionality (ANF) and UE functionality (UEF) to allow the network device 105 to act as a scheduling entity and a receiving entity (for example, a scheduled entity). Each of the functionalities may be operated via one or more backhaul links. ANF functionality may enable each network device 105 to operate as a scheduling entity over one or more access links, and communicate with one or more UEs 115 located within the IAB network. ANF functionality may further enable each network device 105 to operate as a scheduling entity over one or more coupled backhaul links or to facilitate communication between the one or more other network devices 105 of the IAB network (via the mesh topology).

UEF functionality may enable each network device 105 to operate as a scheduled entity and communicate with one or more other network devices 105 to receive information, such as data. In some examples, a network device 105 may include a routing table for examining a received data packet and forwarding the packet along the best path of the IAB network toward the specified IP address of the packet's destination. In some examples, each relay network device 105 (for example, a network device operating as an intermediate access node) may be associated with a single MT function, and may employ backhaul relaying as shown. In some other examples, a relay network device 105 may support multiple MT functions, in which case the relay network devices 105 may be capable of multi-connected cellular backhaul.

As described herein, the wireless communications system 300 may employ one or more wireless access links for establishing mobile access for one or more UEs 115. Each of the network devices 105 and the UEs 115 may be configured to support cellular radio access technologies (RATs), such as mmW-based RATs, for access traffic between the UEs 115 and the network devices 105. Moreover, each of network devices 105 may share resources of the configured RATs for access traffic with backhaul traffic over the network (such as in the case of IAB).

As described with reference to FIG. 2, the wireless communications system 300 may support methods for configuring power utilization modes in an IAB network. In some cases, the IAB network may operate in mmW frequencies ranges to meet high speed demand. In some cases, operating in mmW frequencies ranges may cause signal attenuation. The cell size may shrink to account for the increased signal attenuation and the number of cells may increase to cover the same area such that the number of network devices 105 in a network may increase. Additionally or alternatively, more network devices 105 may be added to a network to account for blockage. The addition of network devices 105 to account for signal attenuation and blockage may cause a network to become over deployed. Maintaining network devices 105 at full activity levels at all times in an over-deployed network may cause the overhead and energy consumption of a network to be high. The wireless communications system 300 may configure power utilization modes of one or more network devices 105 to lower overhead and energy consumption in an over-deployed network as described with reference to FIG. 2.

Signaling associated with implementing power utilization modes in one or more network devices 105 may be configured. For example, signaling may be implemented to indicate information to one or more network devices 105, request information about one or more network devices 105, request a change of mode of activity of a network device 105 (e.g., child node, parent node, neighboring mode), or request a change of mode of activity of the same node transmitting the request. Signaling may be defined on the F1-AP interface, or the universal mobile telecommunications service (UMTS) air interface (Uu interface). At the F1-AP interface, signaling may occur from CU to DU, or from DU to CU. At the Uu interface, signaling may occur from CU to MT (e.g., via an RRC message, a SIB), from MT to CU (e.g., via an RRC message), from DU to MT (e.g., via downlink control information (DCI), a Layer 1 (L1) reference signal, a medium access control (MAC) control element (CE), a master information block (MIB), a SIB1), or from MT to DU (e.g., via uplink control information (UCI), a random access channel (RACH), a MAC-CE).

Network device 105-g may be an IAB-donor and may serve coverage area 110-a. Network devices 105-h, 105-i, 105-j, and 105-k may each be IAB-nodes that each serve coverage areas 110-b, 110-c, 110-d, and 110-e, respectively. Network devices 105-h, 105-i, 105-j, and 105-k may each be child nodes, parent nodes, neighboring nodes, or a combination thereof. Network device 105-g may transmit signaling 305-a to network device 105-h or signaling 305-c to network device 105-k. The signaling may include information about one or more network devices 105, or a request for network devices 105-h and 105-k to change power utilization modes. Network devices 105-h and 105-k may transmit signaling 305-b and 305-d to network device 105-g that may confirm that each network device 105-h and 105-k made the switch to the indicated power utilization mode, respectively. Additionally or alternatively, signaling 305-b and 305-d may include information about or more network devices 105 such as network devices 105-h and 105-k, respectively, or information about neighboring nodes, parent nodes, or child nodes, or a combination thereof. Additionally or alternatively, signaling 305-b and 305-d may include requests for network devices 105-h and 105-k to change power utilization modes, respectively. Network devices 105-h and 105-i may communicate via signaling 305-e. Network devices 105-k and 105-i may communicate via signaling 305-f and 305-g. Network devices 105-i and 105-j may communicate via signaling 305-i and 305-h.

A path may be maintained from every node to the IAB-donor which has a wireless connection to the core network 130. As describe herein, a common occurrence in mmW operation is blockage. To mitigate the impacts of blockage, multiple paths from each IAB-node to the IAB-donor may be configured. For example, multiple paths from network device 105-g (e.g., IAB-donor) to network device 105-i and 105-j may be configured. Signaling 305-e between network device 105-h and 105-i may occur if network device 105-i is otherwise blocked from network device 105-k, or 105-j, or a combination thereof. Signaling 305-e may act as a backup connection for robustness against blockage.

Signaling on the mode of operation of a network device (e.g., IAB-node) may indicate the mode of activity. The power utilization mode may be indicated explicitly or implicitly. The power utilization mode may be implicitly or explicitly indicated via an indication of supported, dismissed, resumed functions or services characteristic of a power utilization mode. In some cases, a power utilization mode may be implicitly or explicitly indicated via an indication of transmission or reception beam configuration per function or service, characteristic of a power utilization mode. In some cases, the network devices 105 may be pre-configured with the different power utilization modes. For example, a first power utilization mode may drop the function of sending paging messages, but perform all other functions a fully active device may perform. A second power utilization mode may drop sending information for initial access and handover but perform all other functions. A third power utilization mode may drop data communication but perform all other functions. A fourth power utilization mode may support all functions but lower the periodicity of transmissions and receptions associated with one or more of the functions. A fifth power utilization mode may drop one or more functions and also lower the transmission power but keep all other function configurations the same. A sixth power utilization mode may drop one or more functions and lower the transmission power of one or more functions and lower the periodicity associated with one or more functions.

Any number of power utilization modes may be configured that alter the functions performed, the configurations or parameters associated with the functions, or a combination thereof. The network device 105 may be configured with the knowledge of each power utilization mode. Signaling between one or more network devices 105 may indicate one of the power control configurations the network device is preconfigured with. For example, if there are four power utilization modes, two bits may be associated with each mode. A 00 may indicate power utilization mode 1, 01 may indicate power utilization mode 2, a 10 may indicate power utilization mode 3, and a 11 may indicate power utilization mode 4.

Additionally or alternatively, signaling of a power utilization mode may include at least one bit for each function and configuration. The bits included in the signaling may indicate the supported functions, or configurations associated with the power utilization mode. For example, one bit may be used to indicate whether a function is supported. A 1-bit may indicate that the function is supported and a 0-bit may indicate that the function is to be dropped, or vice versa. More than one bit may be associated with each configuration or parameter associated with a given function to indicate a level change. For example, three bits may be associated with transmission power and the bits received for transmission power may indicate a level of transmission power to be used for one or more functions.

The power utilization mode may be explicitly indicated by receiving or transmitting the full bit index associated with the preconfigured power mode, or receiving a bit for each function and configuration. The power utilization mode may be implicitly indicated by transmitting a subset of the bits needed to understand the power utilization mode. In some cases, another technique may be utilized to indicate the missing bits. In some cases, one or more bits of a code associated with a power utilization mode may be included in signaling and one or more other bits associated with the code may be implicitly indicated by the resources used to transmit the first set of bits. For example, in the case of four modes, two bits may be needed to indicate a mode. One of the bits may be signaled and the other bit may be indicated by the resource used to transmit the first bit. In this example, a first half of a frame may indicate a bit of zero and the second half of a frame may include a bit of one. For example, the actual signaling of a power utilization mode may include a zero or one. If the receiver detects this bit in the first half of a frame or TTI, the missing bit may be zero, or if the receiver detects this bit in the second half of a frame, the missing but may be a one. The combination of the signaled bit and the implied bit may indicate a power utilization mode. For example, the signaled bit may be a one and may be received in the first half of the frame or TTI so the implied bit may be a zero. The power utilization code may be 10 and may indicate power utilization mode 3.

The signaling may carry an indication of a mode of activity of a network device 105 (e.g., a parent node, a child node, or a neighboring node, or network device 105 itself may transmit the indication), an indication of a future mode of activity of a network device 105 (e.g., a parent node, a child node, or a neighboring node, or a network device 105 itself may transmit the indication), a request for an indication of a mode of activity of a network device 105 (e.g., a parent node, a child node, a neighboring node), a request for a network device (e.g., a parent node, a child node, a neighboring node) to change modes of activity, or a request to switch to a new mode of activity by the network device 105 itself. In some cases, when signaling an indication of future power utilization modes to be implemented by a child node, neighboring node, or parent node, the signaling may include information on the time of transition to the indicated power utilization mode. In some cases, when requesting another network device 105 to change modes, the signaling may include information on a time or condition to transition to the requested power utilization mode. In some cases, when requesting by a network device 105 to switch itself the request may include information on a time or condition for the requested change in modes. For example, the signaling make indicate a future time to switch modes, a duration to wait before switching modes, or a condition that may trigger the switch in modes. An example of a condition may include a load of a region, remaining battery life, etc. Aspects of the signaling between one or more of the network devices 105 regarding power utilization modes may be implicitly or explicitly indicated.

Network devices 105 may receive a signaling configuration that may indicate a periodicity in which the network device 105 may transmit the signaling, or a time when the network device 105 may transmit the signaling. Signaling pertaining to mode of operation of a network device 105 (e.g., IAB-node) may be periodic such that the signaling occurs at regular intervals. In some cases, signaling may be aperiodic such that the signaling occurs irregularly and may be performed dynamically or as-needed. In some cases, signaling may be event-triggered. In some cases, a change in power status (e.g., power source, battery level, charge state), a change of network load, a request to report information, or a handover of a child UE or MT may trigger transmission of signaling by one or more network devices 105 to indicate a power utilization mode by the one or more network devices 105. In some cases, detecting that a condition is satisfied, as determined by a reporting configuration (e.g., received from a CU or other control entity), may trigger transmission of signaling by one or more network devices 105 that indicates a power utilization mode used by the one or more network devices 105. The signaling configuration (e.g., periodicity timing, reporting conditions) may be determined and transmitted by a CU, parent nodes, local control node, etc., to other nodes within the IAB network. In case of central control, a CU may indicate a signaling configuration. In case of distributed control, a local control node may determine a signaling configuration. An IAB node may receive the signaling configuration and may transmit signaling that indicates a power utilization mode in accordance with the received signaling configuration.

Figure 4:
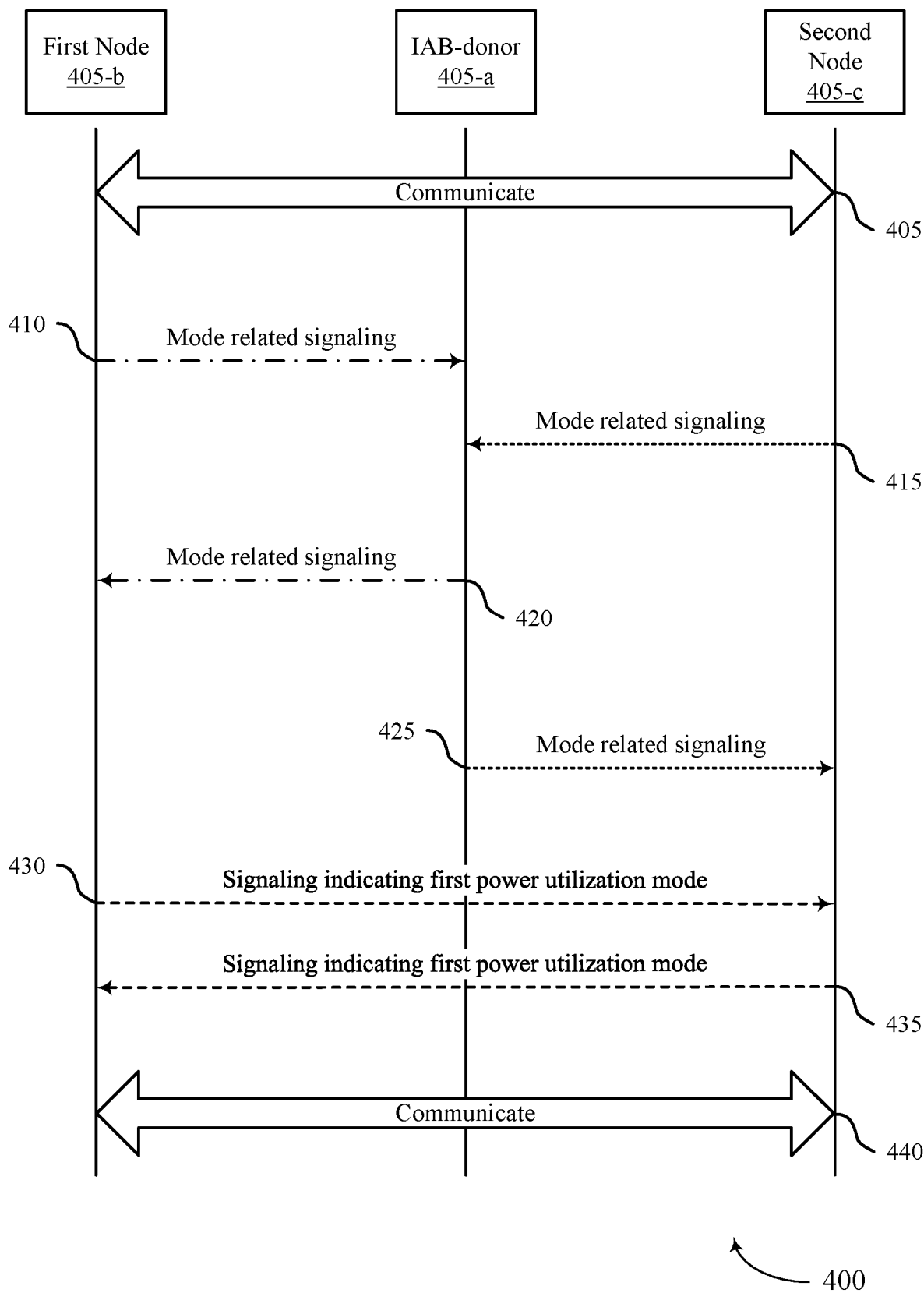
FIG. 4 illustrates an example of a process flow in a system in accordance with aspects of the present disclosure.

FIG. 4 illustrates an example of a process flow 400 in accordance with various aspects of the present disclosure. The process flow 400 may illustrate signaling to support power utilization modes. For example, IAB-donor 405-a may indicate to one or more nodes 405 power utilization modes for power saving. IAB-donor 405-a and first and second nodes 405-b and 405-c may be examples of the corresponding wireless devices described with reference to FIGS. 1 through 3. In some cases, instead of IAB-donor 405-a transmitting power utilization mode signaling, a different type of wireless device (e.g., nodes 405) may perform power utilization mode signaling. Alternative examples of the following may be implemented, where some steps are performed in a different order than described or are not performed at all. In some cases, steps may include additional features not mentioned below, or further steps may be added.

In some cases, IAB-donor node 405-a may provide access to child UEs 115 and wireless backhaul functionality to IAB-nodes. IAB-donor node 405-a may have a wireline connection to the core network. IAB-donor 405-a may include a CU for control of the IAB-network and one or more DUs for scheduling child IAB-nodes. First node 405-b and second node 405-c may be child nodes of IAB-donor node 405-a. First node 405-b and second node 405-c may be neighboring nodes. First node 405-b and second node 405-c may each be parent nodes to other nodes or UEs. In some case, the first node 405-b or second node 405-c, or a combination thereof may each be IAB-donor nodes.

At 405, first node 405-b and second node 405-c may communicate with each other. First node 405-b may be fully active or may be operating in a power utilization mode. Second node 405-c may be fully active or may be operating in a power utilization mode.

At 410, first node 405-b may optionally transmit mode related signaling to IAB-donor node 405-a. The signaling may include an indication of the power utilization mode the first node 405-a is operating in, a request for an indication of the power utilization mode the IAB-donor node 405-a is operating in, a request for an indication of the power utilization mode the second node 405-c is operating in, a request for an indication of the power utilization mode a child node or other neighboring nodes are operating in, or a recommendation for the IAB-node 405-a, the second node 405-c, other neighboring nodes, or child nodes to switch power utilization modes. The signaling may also include a request for the first node 405-a to switch power utilization modes. At 415, second node 405-c may transmit mode related signaling to IAB-donor node 405-a. The signaling transmitted by second node 405-c may include the same or similar information or requests as the signaling from first node 405-b to IAB-donor 405-a.

At 420, IAB-donor node 405-a may transmit mode related signaling to first node 405-b. At 425, IAB-donor node 405-a may transmit mode related signaling to second node 405-c. The mode related signaling from IAB-donor node 405-a may indicate the power utilization modes of the IAB-donor node 405-a or of one or more neighboring nodes, parent nodes, or child nodes of first or second nodes 405-b and 405-c. The signaling may also request information from the first or second nodes 405-b and 405-c. The signaling may also indicate that the first or second nodes 405-b and 405-c should switch power utilization modes. The IAB-donor node 405-a may indicate explicitly or implicitly which mode the first or second node 405-b or 405-c should switch to. Mode related signaling may be periodic, aperiodic or event-triggered. The signaling may include a time, or event at which the nodes 405 should switch power utilization modes.

At 430, first node 405-*b* may transmit to second node 405-*c* signaling indicating a first power utilization mode used by first node 405-*b*. For example, first node 405-*b* may transmit to second node 405-*c* signaling that indicates that the first node of a wireless backhaul communications network is operating in a first power utilization mode of a set of different power utilization modes. At 435, first node 405-*b* may receive signaling indicating a first power utilization mode of the second node 405-*c*. For example, first node 405-*b* may receive signaling that indicates that a second node of a wireless backhaul communications network is operating in a first power utilization mode of a set of different power utilization modes.

The signaling may indicate an index corresponding to the first power utilization mode, and each index may correspond to a respective power utilization mode in a set of multiple power utilization modes. The signaling may indicate a function support configuration that may indicate which functions of a set of functions are supported by the first power utilization mode. The signaling may indicate a service support configuration that indicates which services of a set of services is supported by the power utilization mode. At 440, first node 405-*b* and second node 405-*c* may communicate with each other. For example, first node 405-*b* may communicate with second node 405-*c* of the wireless backhaul communications network based on the first power utilization mode.

Figure 5:
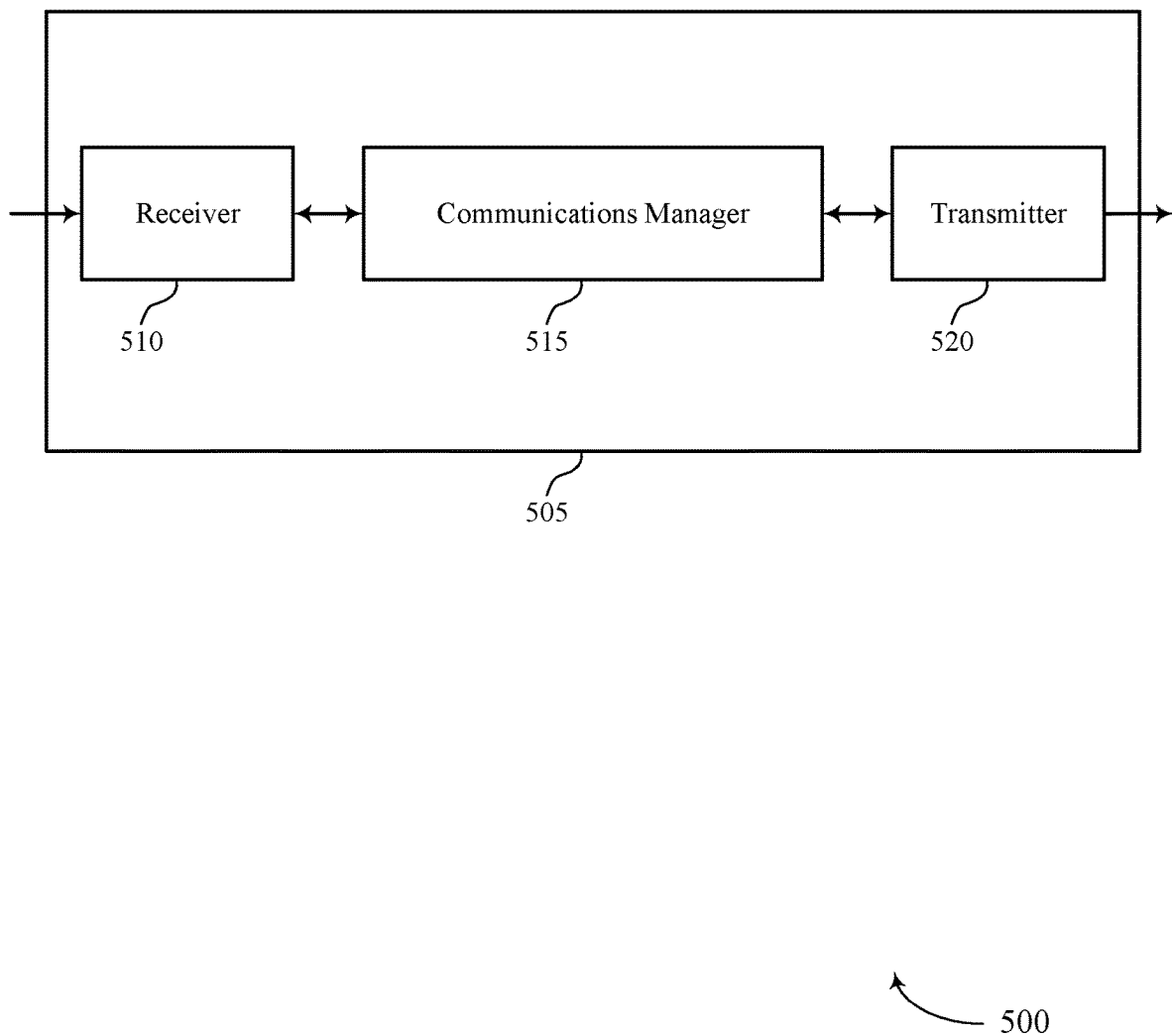
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a base station 105 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to signaling to support power utilization modes for power saving). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit signaling that indicates that the first node of a wireless backhaul communications network is operating in a first power utilization mode of a set of different power utilization modes and communicate with a second node of the wireless backhaul communications network based on the first power utilization mode. The communications manager 515 may also receive signaling that indicates that a second node of a wireless backhaul communications network is operating in a first power utilization mode of a set of different power utilization modes and communicate with the second node of the wireless backhaul communications network based on the first power utilization mode. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The communications manager 515 as described herein may be implemented to realize one or more potential advantages. One implementation may allow the device 505 to communicate power utilization modes between IAB-nodes and the device 505, and more specifically to implement power utilization modes at 805 and one or more IAB-nodes. For example, the device 505 may receive signaling from one of more IAB-node that indicates device 505 should change or implement power saving modes.

Based on implementing the feedback mechanism techniques as described herein, a processor of a UE 115 or base station 105 (e.g., controlling the receiver 510, the transmitter 520, or the transceiver 820 as described with reference to FIG. 8) may decrease energy consumption and overhead in an over-deployed IAB-network because the power utilization modes may decrease the energy used by a UE 115 or base station 105.

Figure 6:
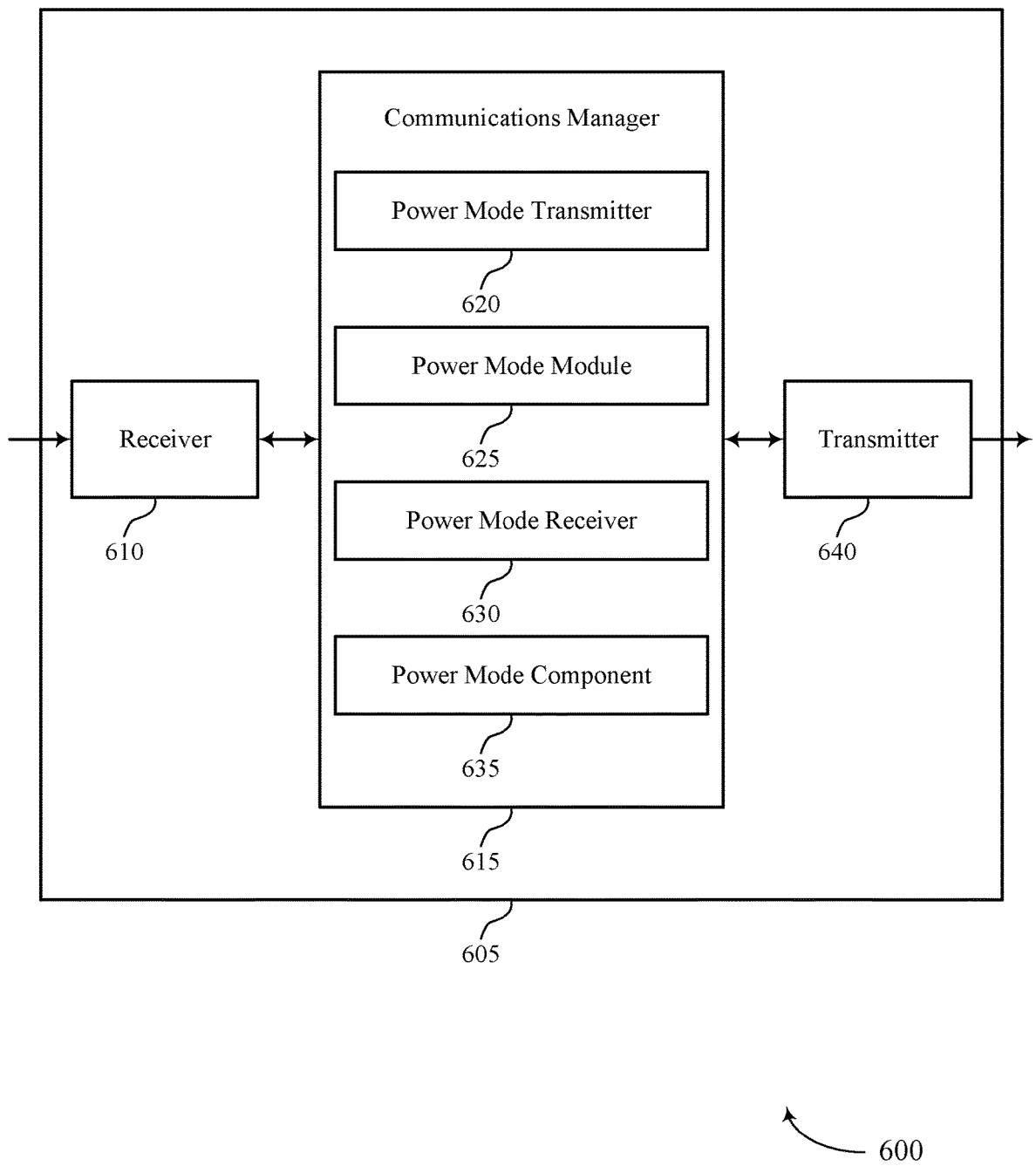

FIG. 6 shows a block diagram 600 of a device 605 in accordance with aspects of the present disclosure. The device 605 may be an example of aspects of a device 505, or a base station 105 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to signaling to support power utilization modes for power saving). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a power mode transmitter 620, a power mode module 625, a power mode receiver 630, and a power mode component 635. The communications manager 615 may be an example of aspects of the communications manager 810 described herein.

The power mode transmitter 620 may transmit signaling that indicates that the first node of a wireless backhaul communications network is operating in a first power utilization mode of a set of different power utilization modes. The power mode module 625 may communicate with a second node of the wireless backhaul communications network based on the first power utilization mode.

The power mode receiver 630 may receive signaling that indicates that a second node of a wireless backhaul communications network is operating in a first power utilization mode of a set of different power utilization modes. The power mode component 635 may communicate with the second node of the wireless backhaul communications network based on the first power utilization mode.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
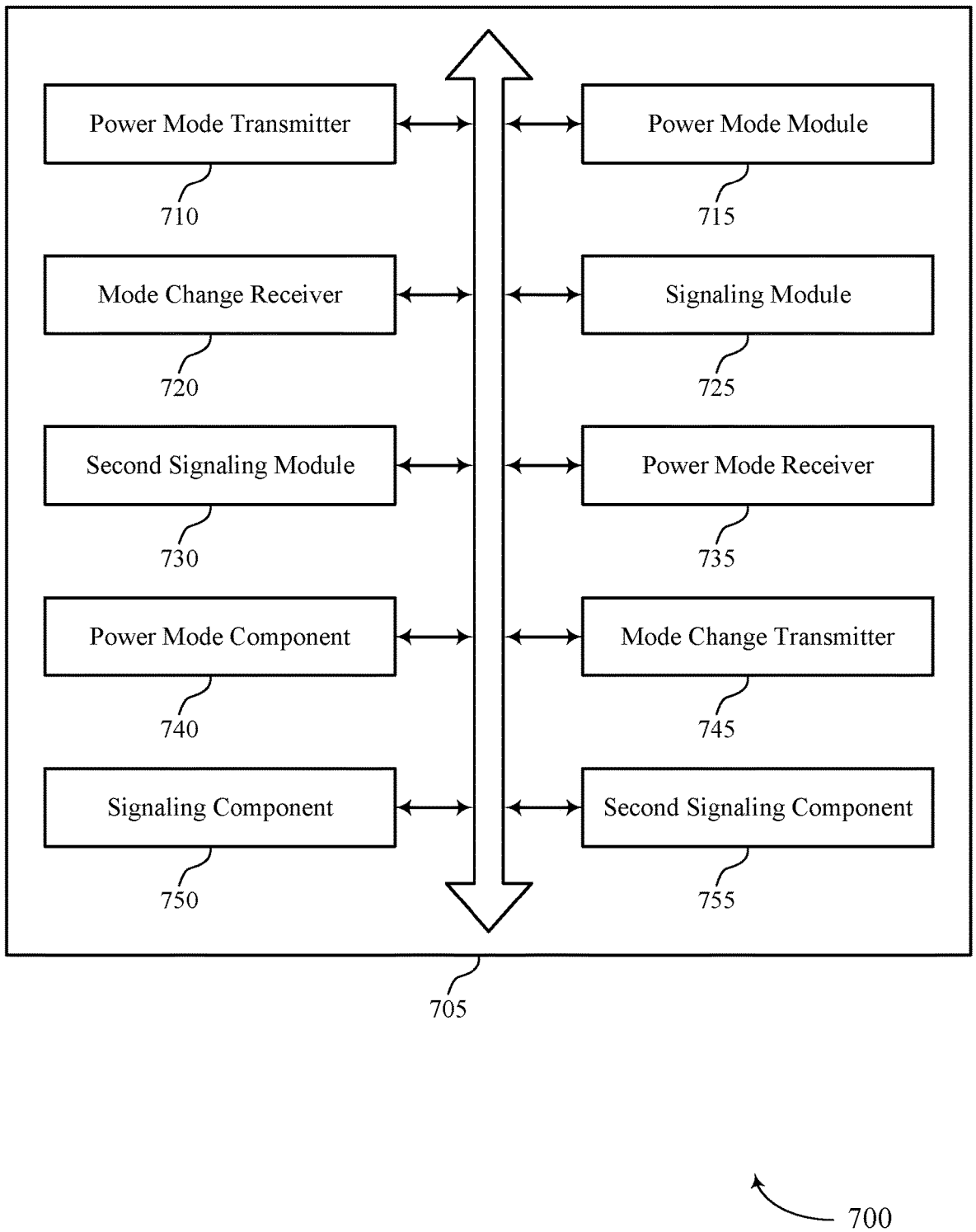
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include a power mode transmitter 710, a power mode module 715, a mode change receiver 720, a signaling module 725, a second signaling module 730, a power mode receiver 735, a power mode component 740, a mode change transmitter 745, a signaling component 750, and a second signaling component 755. Each of these modules may communicate, directly or indirectly, with one another (e.g., via one or more buses).

The power mode transmitter 710 may transmit signaling that indicates that the first node of a wireless backhaul communications network is operating in a first power utilization mode of a set of different power utilization modes. In some examples, the power mode transmitter 710 may transmit the signaling that indicates an index corresponding to the first power utilization mode. In some examples, the power mode transmitter 710 may transmit the signaling that indicates a function support configuration that indicates which one or more functions of a set of functions is supported or is not supported to indicate the first power utilization mode. In some examples, the power mode transmitter 710 may transmit the signaling that indicates a service support configuration that indicates which one or more services of a set of services is supported or is not supported to indicate the first power utilization mode.

In some examples, the power mode transmitter 710 may transmit the signaling that indicates a power utilization configuration to indicate the first power utilization mode. In some cases, the power utilization configuration indicates a transmission power level, or a number of communication occasions per time period, or a beam sweep configuration, or a beam configuration, or any combination thereof.

In some examples, the power mode transmitter 710 may transmit the signaling that indicates a communication configuration that indicates which one or more functions of a set of functions is supported or is not supported to indicate the first power utilization mode. In some examples, the power mode transmitter 710 may transmit the signaling that indicates a communication configuration that indicates which one or more services of a set of services is supported or is not supported to indicate the first power utilization mode. In some cases, the communication configuration is a transmission configuration, or a reception configuration, or a beam configuration, or any combination thereof. In some cases, the communication configuration corresponds to a respective function of the set of functions. In some cases, the communication configuration includes a bit field indicating that a first function of the set of functions is supported or is not supported. In some cases, the communication configuration corresponds to a respective service of the set of services. In some cases, the communication configuration includes a bit field indicating that a first service of the set of services is supported or is not supported.

In some examples, the power mode transmitter 710 may transmit the signaling to indicate time information to indicate when the first power utilization mode is active. In some examples, the power mode transmitter 710 may transmit the signaling within a first resource of a set of available resources to indicate the first power utilization mode. In some examples, the power mode transmitter 710 may transmit the signaling that is DCI, or an RRC message, or an L1 reference signal, or a MAC-CE, or a MIB, or a SIB, or UCI, or a RACH message, or any combination thereof. In some examples, the power mode transmitter 710 may transmit the signaling from a CU or a DU to an MT.

The power mode module 715 may communicate with a second node of the wireless backhaul communications network based on the first power utilization mode.

In some examples, the power mode module 715 may communicate with the second node of the wireless backhaul communications network that is a parent node, or a child node, or a neighbor node, or a control entity, or any combination thereof, of the wireless backhaul communications network. In some cases, the first node is configured to perform an MT function or a DU function and the second node is configured as a CU or to perform an MT function or a DU function. In some cases, the first node is an IAB node and the second node is a CU, or a UE, or an IAB node. In some cases, the first power utilization mode utilizes less power than a second power utilization mode of the set of different utilization modes.

The power mode receiver 735 may receive signaling that indicates that a second node of a wireless backhaul communications network is operating in a first power utilization mode of a set of different power utilization modes. In some examples, the power mode receiver 735 may receive the signaling that indicates an index corresponding to the first power utilization mode. In some examples, the power mode receiver 735 may receive the signaling that indicates a function support configuration that indicates which one or more functions of a set of functions is supported or is not supported to indicate the first power utilization mode. In some examples, the power mode receiver 735 may receive the signaling that indicates a service support configuration that indicates which one or more services of a set of services is supported or is not supported to indicate the first power utilization mode.

In some examples, the power mode receiver 735 may receive the signaling that indicates a power utilization configuration to indicate the first power utilization mode. In some cases, the power utilization configuration indicates a transmission power level, or a number of communication occasions per time period, or a beam sweep configuration, or a beam configuration, or any combination thereof.

In some examples, the power mode receiver 735 may receive the signaling that indicates a communication configuration that indicates which one or more functions of a set of functions is supported or is not supported to indicate the first power utilization mode. In some cases, the communication configuration is a transmission configuration, or a reception configuration, or a beam configuration, or any combination thereof. In some cases, the communication configuration corresponds to a respective function of the set of functions. In some cases, the communication configuration includes a bit field indicating that a first function of the set of functions is supported or is not supported.

In some examples, the power mode receiver 735 may receive the signaling that indicates a communication configuration that indicates which one or more services of a set of services is supported or is not supported to indicate the first power utilization mode. In some cases, the communication configuration corresponds to a respective service of the set of services. In some cases, the communication configuration includes a bit field indicating that a first service of the set of services is supported or is not supported.

In some examples, the power mode receiver 735 may receive the signaling that indicates time information to indicate when the first power utilization mode is active. In some examples, the power mode receiver 735 may receive the signaling within a first resource of a set of available resources to indicate the first power utilization mode. In some examples, the power mode receiver 735 may receive the signaling that is DCI, or an RRC message, or an L1 reference signal, or a MAC-CE, or a MIB, or a SIB, or UCI, or a RACH message, or any combination thereof. In some examples, the power mode receiver 735 may receive the signaling at a CU or a DU from an MT.

The power mode component 740 may communicate with the second node of the wireless backhaul communications network based on the first power utilization mode. In some examples, the power mode component 740 may communicate with the second node of the wireless backhaul communications network that is a parent node, or a child node, or a neighbor node, or a control entity, or any combination thereof, of the wireless backhaul communications network. In some cases, the first node is configured to perform an MT function or a DU function and the second node is configured as a CU or to perform an MT function or a DU function. In some cases, the first node is an IAB node and the second node is a CU, or a UE, or an IAB node. In some cases, the first power utilization mode utilizes less power than a second power utilization mode of the set of different utilization modes.

The mode change receiver 720 may receive a mode change request that requests that the first node operate in the first power utilization mode, where the first power utilization mode is transmitted based on the mode change request. In some examples, the mode change receiver 720 may receive a mode change instruction that instructs the first node to operate in the first power utilization mode, where the first power utilization mode is transmitted based on the mode change instruction. In some cases, the mode change instruction indicates when the first node is to operate in the first power utilization mode.

The signaling module 725 may determine a signaling configuration, where the signaling is transmitted in accordance with the signaling configuration. In some examples, the signaling module 725 may receive the signaling configuration from a CU of the wireless backhaul communications network. In some examples, the signaling module 725 may detect a power status change, or a network load change, or a reporting request, or a handover request, or a reporting condition, or any combination thereof, based on the signaling configuration, where the signaling is transmitted based on the detecting.

In some cases, the signaling configuration is a periodic signaling configuration, an aperiodic signaling configuration, or an event-triggered signaling configuration, or any combination thereof. In some cases, the signaling configuration indicates a periodicity in which the first node is to transmit the signaling, or a time when the first node is to transmit the signaling, or a reporting condition after detection of which the first node is to transmit the signaling, or any combination thereof. In some cases, a local control node associated with the first node determines the signaling configuration.

The second signaling module 730 may transmit second signaling to indicate a third node of the wireless backhaul communications network is operating in a second power utilization mode of the set of different utilization modes, where the third node is a parent node, or a child node, or a neighbor node, or any combination thereof. In some examples, the second signaling module 730 may transmit second signaling requesting that a third node transmit information indicating in which power utilization mode of the set of different utilization modes the third node is operating, where the third node is a parent node, or a child node, or a neighbor node, or any combination thereof. In some examples, the second signaling module 730 may transmit second signaling to instruct a third node to operate in a second power utilization mode of the set of different utilization modes, where the third node is a parent node, or a child node, or a neighbor node, or any combination thereof.

The mode change transmitter 745 may transmit a mode change request that requests that the second node operate in the first power utilization mode, where the first power utilization mode is received based on the mode change request. In some examples, the mode change transmitter 745 may transmit a mode change instruction that instructs the second node to operate in the first power utilization mode, where the first power utilization mode is received based on the mode change instruction. In some cases, the mode change instruction indicates when the first node is to operate in the first power utilization mode.

The signaling component 750 may determine a signaling configuration, where the signaling is received in accordance with the signaling configuration. In some cases, the signaling configuration is a periodic signaling configuration, an aperiodic signaling configuration, or an event-triggered signaling configuration, or any combination thereof. In some cases, the signaling configuration indicates a periodicity in which the second node is to transmit the signaling, or a time when the second node is to transmit the signaling, or a reporting condition after detection of which the second node is to transmit the signaling, or any combination thereof.

In some cases, the first node is a CU or a DU in the wireless backhaul communications network. In some cases, a local control node associated with the first node determines the signaling configuration. In some cases, the signaling is received based on a detection of a power status change, or a network load change, or a reporting request, or a handover request, or a reporting condition, or any combination thereof.

The second signaling component 755 may receive second signaling that indicates a third node of the wireless backhaul communications network is operating in a second power utilization mode of the set of different utilization modes, where the third node is a parent node, or a child node, or a neighbor node, or any combination thereof. In some examples, the second signaling component 755 may receive second signaling from a third node that indicates that the third node is operating in a second power utilization mode of the set of different power utilization modes, where the third node is a parent node, or a child node, or a neighbor node, or any combination thereof.

Figure 8:
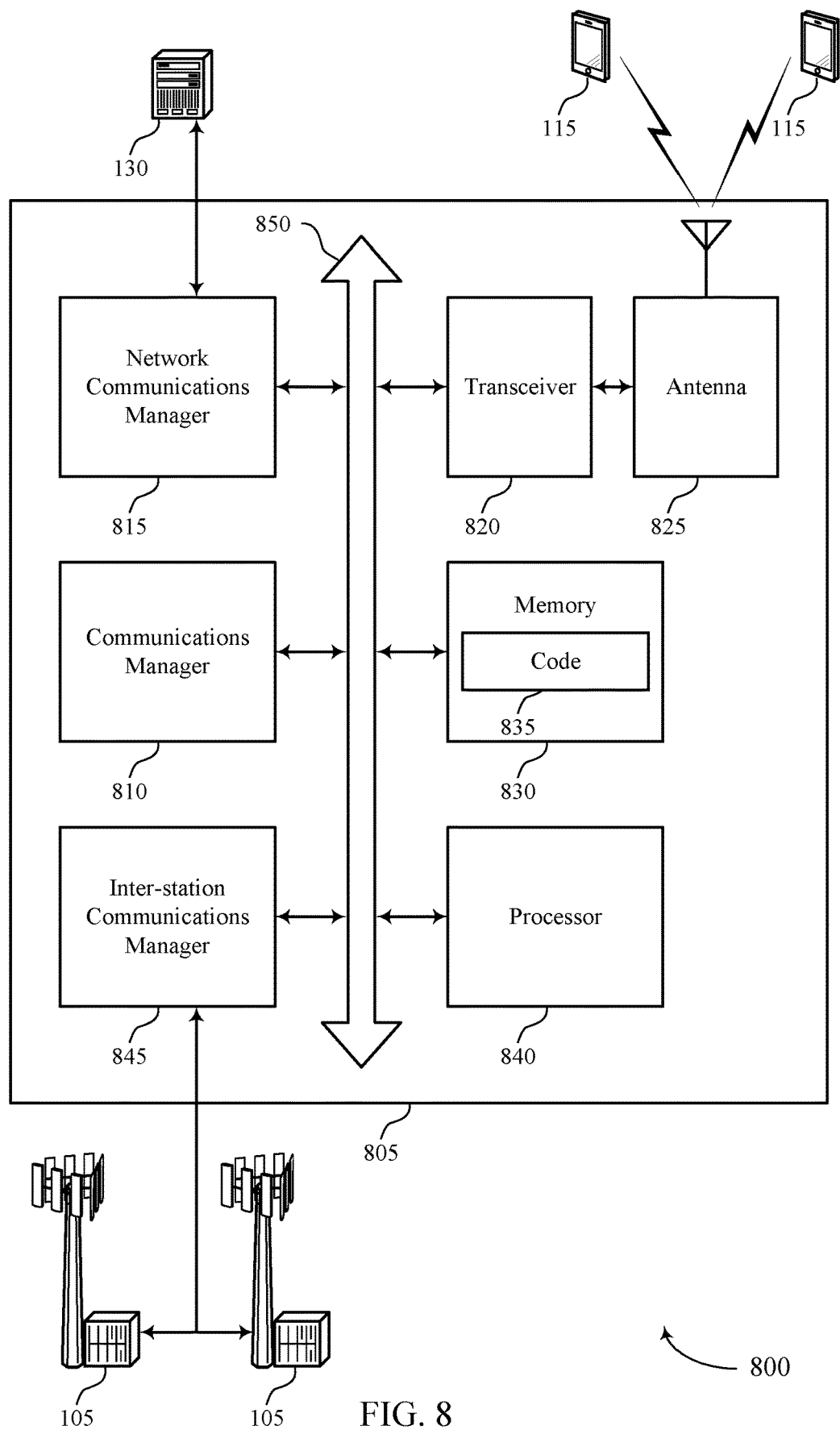
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a base station 105 as described herein. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (e.g., bus 850).

The communications manager 810 may transmit signaling that indicates that the first node of a wireless backhaul communications network is operating in a first power utilization mode of a set of different power utilization modes and communicate with a second node of the wireless backhaul communications network based on the first power utilization mode. The communications manager 810 may also receive signaling that indicates that a second node of a wireless backhaul communications network is operating in a first power utilization mode of a set of different power utilization modes and communicate with the second node of the wireless backhaul communications network based on the first power utilization mode.

The network communications manager 815 may manage communications with the core network (e.g., via one or more wired backhaul links). For example, the network communications manager 815 may manage the transfer of data communications for client devices, such as one or more UEs 115.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some cases, a memory controller may be integrated into processor 840. The processor 840 may be configured to execute computer-readable instructions stored in a memory (e.g., the memory 830) to cause the device 805 to perform various functions (e.g., functions or tasks supporting signaling to support power utilization modes for power saving).

The inter-station communications manager 845 may manage communications with other base station 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
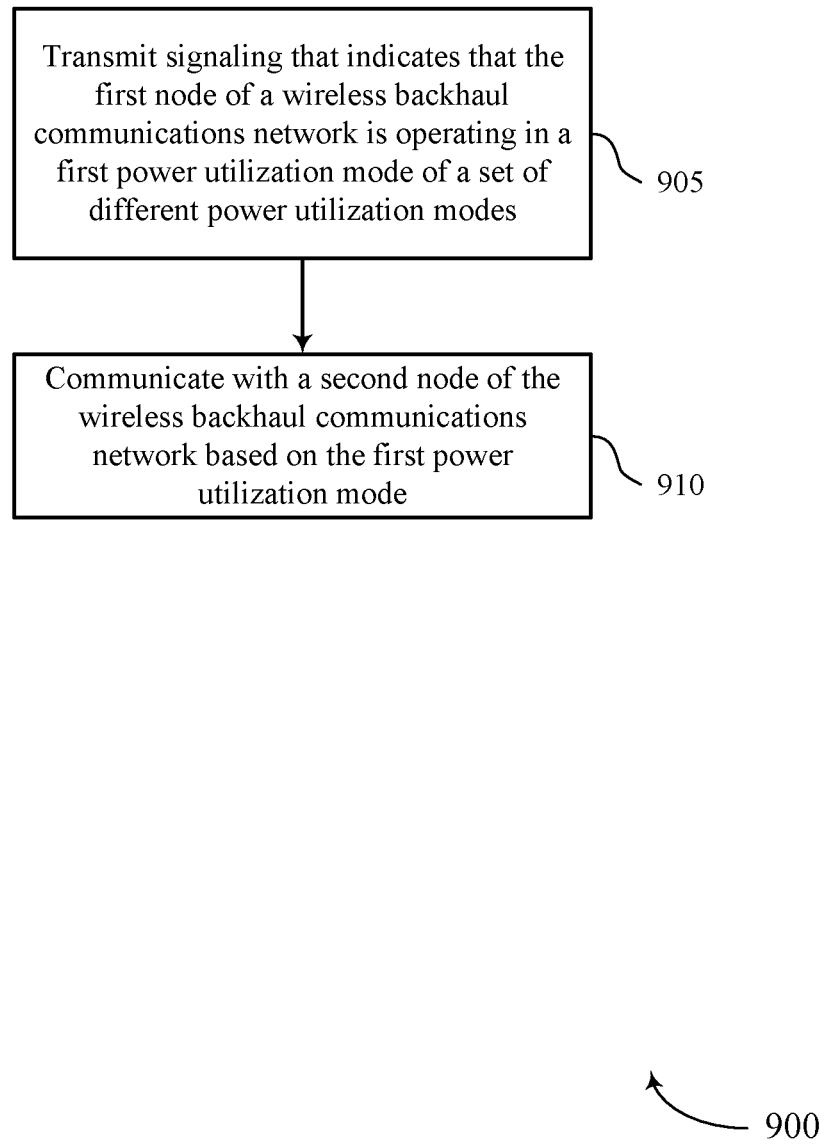
FIGS. 9 through 12 show flowcharts illustrating methods in accordance with aspects of the present disclosure.

FIG. 9 shows a flowchart illustrating a method 900 in accordance with aspects of the present disclosure. The operations of method 900 may be implemented by a base station 105 or its components as described herein. For example, the operations of method 900 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 905, the base station may transmit signaling that indicates that the first node of a wireless backhaul communications network is operating in a first power utilization mode of a set of different power utilization modes. The operations of 905 may be performed according to the methods described herein. In some examples, aspects of the operations of 905 may be performed by a power mode transmitter as described with reference to FIGS. 5 through 8.

At 910, the base station may communicate with a second node of the wireless backhaul communications network based on the first power utilization mode. The operations of 910 may be performed according to the methods described herein. In some examples, aspects of the operations of 910 may be performed by a power mode module as described with reference to FIGS. 5 through 8.

Figure 10:
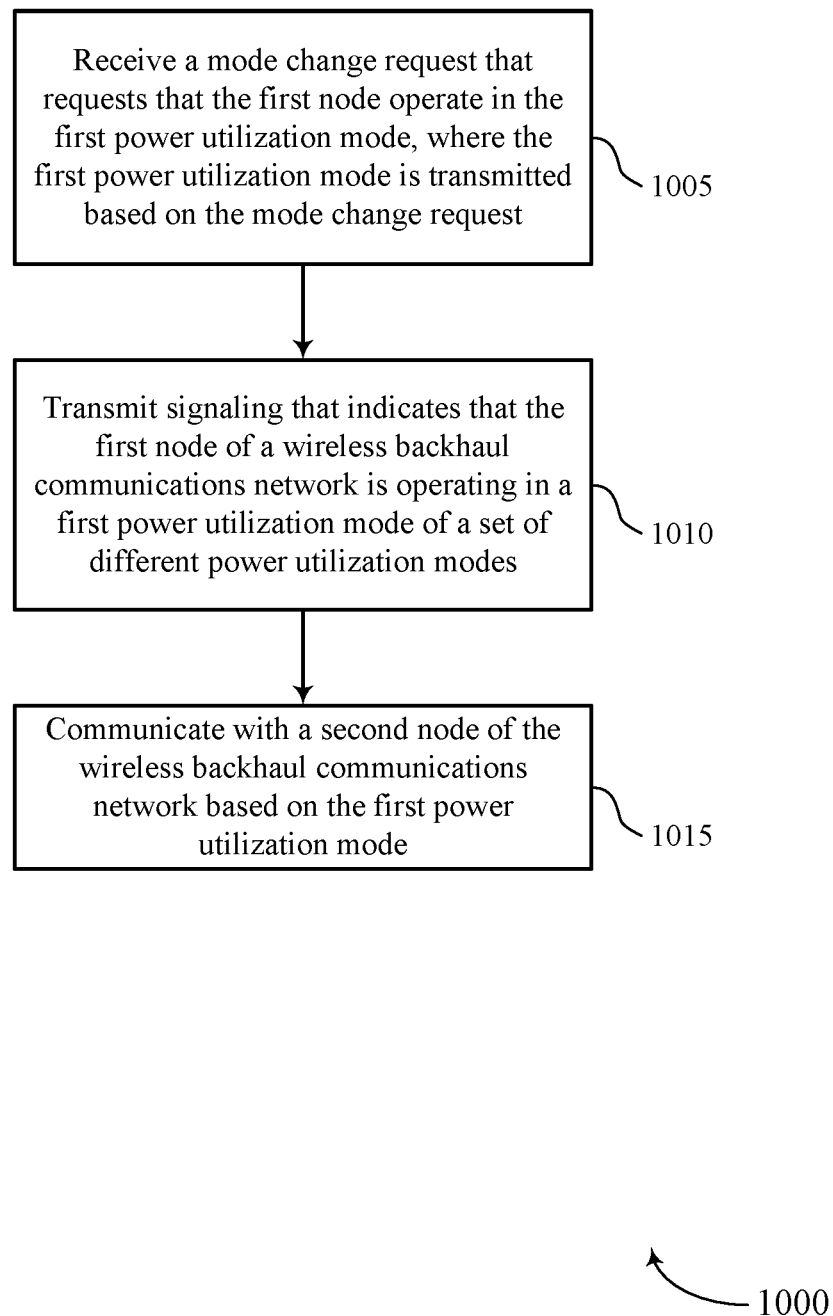

FIG. 10 shows a flowchart illustrating a method 1000 in accordance with aspects of the present disclosure. The operations of method 1000 may be implemented by a base station 105 or its components as described herein. For example, the operations of method 1000 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1005, the base station may receive a mode change request that requests that the first node operate in the first power utilization mode, where the first power utilization mode is transmitted based on the mode change request. The operations of 1005 may be performed according to the methods described herein. In some examples, aspects of the operations of 1005 may be performed by a mode change receiver as described with reference to FIGS. 5 through 8.

At 1010, the base station may transmit signaling that indicates that the first node of a wireless backhaul communications network is operating in a first power utilization mode of a set of different power utilization modes. The operations of 1010 may be performed according to the methods described herein. In some examples, aspects of the operations of 1010 may be performed by a power mode transmitter as described with reference to FIGS. 5 through 8.

At 1015, the base station may communicate with a second node of the wireless backhaul communications network based on the first power utilization mode. The operations of 1015 may be performed according to the methods described herein. In some examples, aspects of the operations of 1015 may be performed by a power mode module as described with reference to FIGS. 5 through 8.

Figure 11:
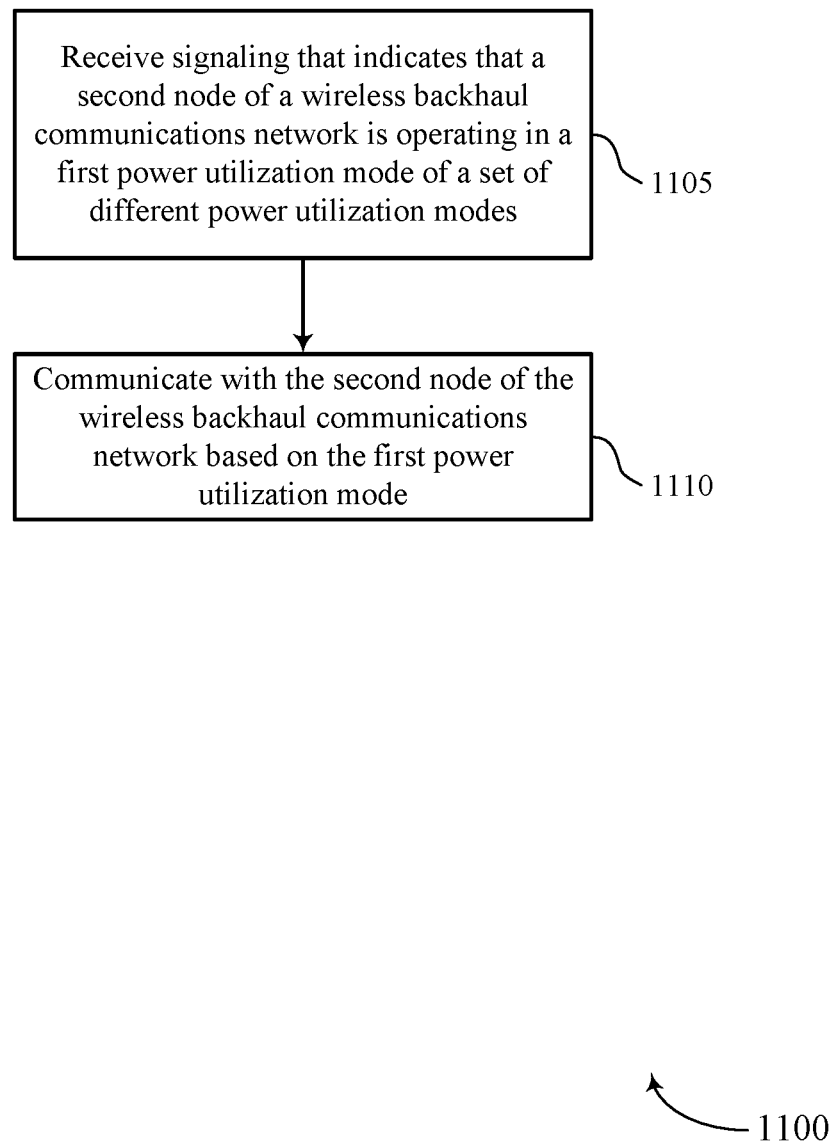

FIG. 11 shows a flowchart illustrating a method 1100 in accordance with aspects of the present disclosure. The operations of method 1100 may be implemented by a base station 105 or its components as described herein. For example, the operations of method 1100 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1105, the base station may receive signaling that indicates that a second node of a wireless backhaul communications network is operating in a first power utilization mode of a set of different power utilization modes. The operations of 1105 may be performed according to the methods described herein. In some examples, aspects of the operations of 1105 may be performed by a power mode receiver as described with reference to FIGS. 5 through 8.

At 1110, the base station may communicate with the second node of the wireless backhaul communications network based on the first power utilization mode. The operations of 1110 may be performed according to the methods described herein. In some examples, aspects of the operations of 1110 may be performed by a power mode component as described with reference to FIGS. 5 through 8.

Figure 12:
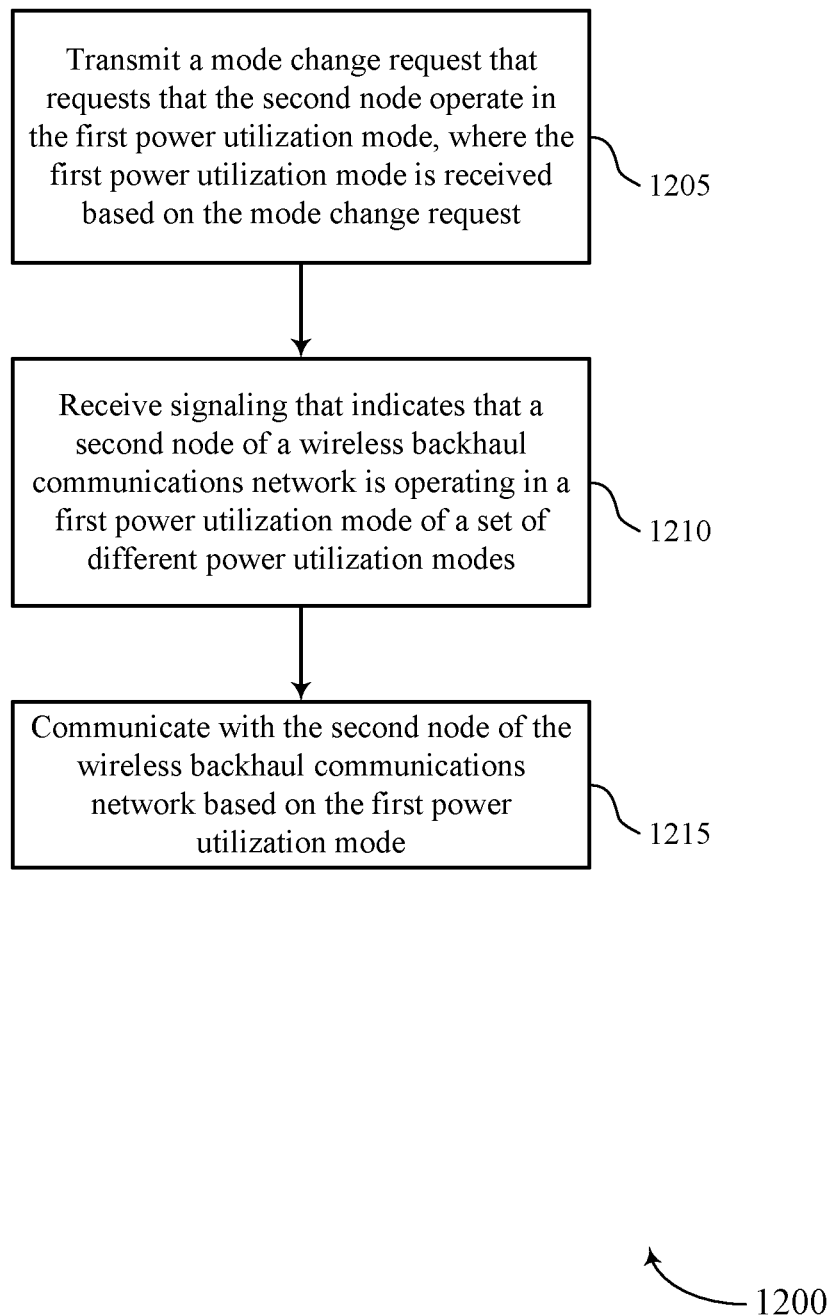

FIG. 12 shows a flowchart illustrating a method 1200 in accordance with aspects of the present disclosure. The operations of method 1200 may be implemented by a base station 105 or its components as described herein. For example, the operations of method 1200 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1205, the base station may transmit a mode change request that requests that the second node operate in the first power utilization mode, where the first power utilization mode is received based on the mode change request. The operations of 1205 may be performed according to the methods described herein. In some examples, aspects of the operations of 1205 may be performed by a mode change transmitter as described with reference to FIGS. 5 through 8.

At 1210, the base station may receive signaling that indicates that a second node of a wireless backhaul communications network is operating in a first power utilization mode of a set of different power utilization modes. The operations of 1210 may be performed according to the methods described herein. In some examples, aspects of the operations of 1210 may be performed by a power mode receiver as described with reference to FIGS. 5 through 8.

At 1215, the base station may communicate with the second node of the wireless backhaul communications network based on the first power utilization mode. The operations of 1215 may be performed according to the methods described herein. In some examples, aspects of the operations of 1215 may be performed by a power mode component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication implemented by a first node of a communications network, comprising:
    transmitting signaling that indicates that the first node is operating in a first power utilization mode of a plurality of different indexed power utilization modes, wherein the first power utilization mode suppresses initial access by one or more user equipments (UEs) and a second power utilization mode of the plurality of different indexed power utilization modes supports the initial access by the one or more UEs, wherein suppressing the initial access by the one or more UEs in the first power utilization mode comprises sending synchronization signal blocks (SSBs) and channel state information-reference signals (CSI-RSs) for handover or measurements and not supporting sending SSBs or system information blocks (SIB) for the initial access, and wherein supporting the initial access in the second power utilization mode supports both sending SSBs and CSI-RSs for handover or measurements and sending SSBs and SIBs for the initial access; and
    communicating with a second node based at least in part on the first power utilization mode.

2. The method of claim 1, wherein transmitting the signaling comprises:
    transmitting the signaling that indicates an index corresponding to the first power utilization mode.

3. The method of claim 1, wherein transmitting the signaling comprises:
    transmitting the signaling that indicates a function support configuration that indicates which one or more functions of a plurality of functions is supported or is not supported to indicate the first power utilization mode.

4. The method of claim 1, wherein transmitting the signaling comprises:
    transmitting the signaling that indicates a service support configuration that indicates which one or more services of a plurality of services is supported or is not supported to indicate the first power utilization mode.

5. The method of claim 1, wherein transmitting the signaling comprises:
    transmitting the signaling that indicates a power utilization configuration to indicate the first power utilization mode.

6. The method of claim 1, wherein transmitting the signaling comprises:
    transmitting the signaling that indicates a communication configuration that indicates which one or more functions of a plurality of functions is supported or is not supported to indicate the first power utilization mode.

7. The method of claim 1, wherein transmitting the signaling comprises:

transmitting the signaling that indicates a communication configuration that indicates which one or more services of a plurality of services is supported or is not supported to indicate the first power utilization mode.

8. A method for wireless communication implemented by a first node of a communications network, comprising:
receiving signaling that indicates that a second node is operating in a first power utilization mode of a plurality of different indexed power utilization modes, wherein the first power utilization mode suppresses initial access by one or more user equipments (UEs) and a second power utilization mode of the plurality of different indexed power utilization modes supports the initial access by the one or more UEs, wherein suppressing the initial access by the one or more UEs in the first power utilization mode comprises sending synchronization signal blocks (SSBs) and channel state information-reference signals (CSI-RSs) for handover or measurements and not supporting sending SSBs or system information blocks (SIB) for the initial access, and wherein supporting the initial access in the second power utilization mode supports both sending SSBs and CSI-RSs for handover or measurements and sending SSBs and SIBs for the initial access; and
communicating with the second node based at least in part on the first power utilization mode.

9. The method of claim 8, wherein receiving the signaling comprises:
receiving the signaling that indicates an index corresponding to the first power utilization mode.

10. The method of claim 8, wherein receiving the signaling comprises:
receiving the signaling that indicates a function support configuration that indicates which one or more functions of a plurality of functions is supported or is not supported to indicate the first power utilization mode.

11. The method of claim 8, wherein receiving the signaling comprises:
receiving the signaling that indicates a service support configuration that indicates which one or more services of a plurality of services is supported or is not supported to indicate the first power utilization mode.

12. The method of claim 8, wherein receiving the signaling comprises:
receiving the signaling that indicates a power utilization configuration to indicate the first power utilization mode.

13. The method of claim 8, wherein receiving the signaling comprises:
receiving the signaling that indicates a communication configuration that indicates which one or more functions of a plurality of functions is supported or is not supported to indicate the first power utilization mode.

14. The method of claim 8, wherein receiving the signaling comprises:
receiving the signaling that indicates a communication configuration that indicates which one or more services of a plurality of services is supported or is not supported to indicate the first power utilization mode.

15. A first node of a communication network, comprising:
one or more memories storing processor-executable code; and
one or more processors
coupled with the one or more memories and operable to execute the code to cause the one or more processors, individually or collectively, to:
transmit signaling that indicates that the first node is operating in a first power utilization mode of a plurality of different indexed power utilization modes, wherein the first power utilization mode suppresses initial access by one or more user equipments (UEs) and a second power utilization mode of the plurality of different indexed power utilization modes supports the initial access by the one or more UEs, wherein suppressing the initial access by the one or more UEs in the first power utilization mode comprises sending synchronization signal blocks (SSBs) and channel state information-reference signals (CSI-RSs) for handover or measurements and not supporting sending SSBs or system information blocks (SIB) for the initial access, and wherein supporting the initial access in the second power utilization mode supports both sending SSBs and CSI-RSs for handover or measurements and sending SSBs and SIBs for the initial access; and
communicate with a second node based at least in part on the first power utilization mode.

16. The first node of claim 15, wherein, to transmit the signaling, the one or more processors are individually or collectively operable to execute the code to cause the one or more processors to:
transmit the signaling that indicates an index corresponding to the first power utilization mode.

17. The first node of claim 15, wherein, to transmit the signaling, the one or more processors are individually or collectively operable to execute the code to cause the one or more processors to:
transmit the signaling that indicates a function support configuration that indicates which one or more functions of a plurality of functions is supported or is not supported to indicate the first power utilization mode.

18. The first node of claim 15, wherein, to transmit the signaling, the one or more processors are individually or collectively operable to execute the code to cause the one or more processors to:
transmit the signaling that indicates a service support configuration that indicates which one or more services of a plurality of services is supported or is not supported to indicate the first power utilization mode.

19. The first node of claim 15, wherein, to transmit the signaling, the one or more processors are individually or collectively operable to execute the code to cause the one or more processors to:
transmit the signaling that indicates a power utilization configuration to indicate the first power utilization mode.

20. The first node of claim 15, wherein, to transmit the signaling, the one or more processors are individually or collectively operable to execute the code to cause the one or more processors to:
transmit the signaling that indicates a communication configuration that indicates which one or more functions of a plurality of functions is supported or is not supported to indicate the first power utilization mode.

21. The first node of claim 15, wherein, to transmit the signaling, the one or more processors are individually or collectively operable to execute the code to cause the one or more processors to:
transmit the signaling that indicates a communication configuration that indicates which one or more services of a plurality of services is supported or is not supported to indicate the first power utilization mode.

22. A first node of a communications network, comprising:
one or more memories storing processor-executable code; and
one or more processors coupled with the one or more memories and operable to execute the code to cause the one or more processors, individually or collectively, to:
receive signaling that indicates that a second node is operating in a first power utilization mode of a plurality of different indexed power utilization modes, wherein the first power utilization mode suppresses initial access by one or more user equipments (UEs) and a second power utilization mode of the plurality of different indexed power utilization modes supports the initial access by the one or more UEs, wherein suppressing the initial access by the one or more UEs in the first power utilization mode comprises sending synchronization signal blocks (SSBs) and channel state information-reference signals (CSI-RSs) for handover or measurements and not supporting sending SSBs or system information blocks (SIB) for the initial access, and wherein supporting the initial access in the second power utilization mode supports both sending SSBs and CSI-RSs for handover or measurements and sending SSBs and SIBs for the initial access; and
communicate with the second node based at least in part on the first power utilization mode.

23. The first node of claim 22, wherein, to receive the signaling, the one or more processors are individually or collectively operable to execute the code to cause the one or more processors to:
receive the signaling that indicates an index corresponding to the first power utilization mode.

24. The first node of claim 22, wherein, to receive the signaling, the one or more processors are individually or collectively operable to execute the code to cause the one or more processors to:
receive the signaling that indicates a function support configuration that indicates which one or more functions of a plurality of functions is supported or is not supported to indicate the first power utilization mode.

25. The first node of claim 22, wherein, to receive the signaling, the one or more processors are individually or collectively operable to execute the code to cause the one or more processors to:
receive the signaling that indicates a service support configuration that indicates which one or more services of a plurality of services is supported or is not supported to indicate the first power utilization mode.

26. The first node of claim 22, wherein, to receive the signaling, the one or more processors are individually or collectively operable to execute the code to cause the one or more processors to:
receive the signaling that indicates a power utilization configuration to indicate the first power utilization mode.

27. The first node of claim 22, wherein, to receive the signaling, the one or more processors are individually or collectively operable to execute the code to cause the one or more processors to:
receive the signaling that indicates a communication configuration that indicates which one or more functions of a plurality of functions is supported or is not supported to indicate the first power utilization mode.

28. The first node of claim 22, wherein, to receive the signaling, the one or more processors are individually or collectively operable to execute the code to cause the one or more processors to:
receive the signaling that indicates a communication configuration that indicates which one or more services of a plurality of services is supported or is not supported to indicate the first power utilization mode.

* * * * *